United States Patent
Takura

(10) Patent No.: US 6,249,095 B1
(45) Date of Patent: Jun. 19, 2001

(54) POLYPHASE MOTOR DRIVING APPARATUS, POLYPHASE MOTOR DRIVING APPARATUS DRIVING METHOD AND POLYPHASE MOTOR SYSTEM

(75) Inventor: Toshiyasu Takura, Hino (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,683

(22) Filed: Sep. 23, 1999

(30) Foreign Application Priority Data

Sep. 29, 1998 (JP) .................................................. 10-275960
Aug. 19, 1999 (JP) .................................................. 11-232721

(51) Int. Cl.$^7$ ..................................................... H02P 7/06
(52) U.S. Cl. ............................................. 318/254; 318/138
(58) Field of Search ..................................... 318/254, 439, 318/138, 685, 696

(56) References Cited

U.S. PATENT DOCUMENTS

| | | | |
|---|---|---|---|
| 4,888,533 | 12/1989 | Gotoh et al. ........................... | 318/254 |
| 5,119,071 | * 6/1992 | Takezawa et al. .................... | 318/130 |
| 5,124,625 | * 6/1992 | Wakabayashi ........................ | 318/603 |
| 5,130,621 | * 7/1992 | Ohi ....................................... | 318/254 |
| 5,339,013 | * 8/1994 | Nakai et al. .......................... | 318/254 |
| 5,367,233 | * 11/1994 | Maeda ................................... | 318/254 |

* cited by examiner

*Primary Examiner*—Robert E. Nappi
*Assistant Examiner*—Rina I. Duda
(74) *Attorney, Agent, or Firm*—Frishauf, Holtz, Goodman, Langer & Chick, P.C.

(57) ABSTRACT

A polyphase motor driving apparatus having a receiving function for receiving a pulse signal from a position detector, which is connected to the rotary shaft of a rotor (having a plurality of poles) of a polyphase motor provided with a stator having a plurality of poles and which generates the pulse signal every time the rotor rotates by 360°/n, where n is a positive integer; and a supply function for judging the present position of the rotor every time one pulse of the pulse signal is received and for supplying a polyphase current to the polyphase motor at a timing based on the judgment, thereby switching the excitation phase of the polyphase motor and rotating the rotor.

10 Claims, 18 Drawing Sheets

FIG. 11

| ADDRESS | MEMORY CONTENTS | OUTPUT STATUS |
|---|---|---|
| F080 | 15H |  |
| F081 | 31H | S1 |
| F082 | 34H | S2 |
| F083 | 1CH | S3 |
| F084 | 0DH | S4 |
| F085 | 05H | S5 |
| F086 | 13H | S6 |
| F087 | 15H |  |

| TORQUE LEVEL | PHASE CURRENT AVERAGE VALUE | DUTY RATE |
|---|---|---|
| 10 | 10 | 1 |
| 9 | 9 | 0.8 |
| 8 | 8 | 0.7 |
| 7 | 7 | 0.6 |
| 6 | 6 | 0.55 |
| 5 | 5 | 0.5 |
| 4 | 4 | 0.47 |
| 3 | 3 | 0.44 |
| 2 | 2 | 0.4 |
| 1 | 1 | 0.3 |

| ADDRESS | DUTY RATE |
|---|---|
| F111 | 0.3 |
| F112 | 0.4 |
| F113 | 0.44 |
| F114 | 0.47 |
| F115 | 0.5 |
| F116 | 0.55 |
| F117 | 0.6 |
| F118 | 0.7 |
| F119 | 0.8 |
| F11A | 1 |

| STEP / PHASE | 1 | 2 | 3 | 4 | 5 | 6 | 7 |
|---|---|---|---|---|---|---|---|
| A | - | S | S | - | N | N | - |
| B | N | N | - | S | S | - | N |
| C | S | - | N | N | - | S | S |

FIG. 25

| OUTPUT PORT | 7 | 6 | 5 | 4 | 3 | 2 | 1 | 0 | HEXADECIMAL NUMBER |
|---|---|---|---|---|---|---|---|---|---|
| EXCITATION PHASE STATUS PS1 | 0 | 0 | 1 | 1 | 0 | 0 | 0 | 1 | 31H |
| PS2 | 0 | 0 | 1 | 1 | 0 | 1 | 0 | 0 | 34H |
| PS3 | 0 | 0 | 0 | 1 | 1 | 1 | 0 | 0 | 1CH |
| PS4 | 0 | 0 | 0 | 0 | 1 | 1 | 0 | 1 | 0DH |
| PS5 | 0 | 0 | 0 | 0 | 0 | 1 | 0 | 1 | 05H |
| PS6 | 0 | 0 | 0 | 1 | 0 | 0 | 1 | 1 | 13H |

FIG. 26

| OUTPUT PORT | 7 | 6 | 5 | 4 | 3 | 2 | 1 | 0 | HEXADECIMAL NUMBER |
|---|---|---|---|---|---|---|---|---|---|
| EXCITATION PHASE STATUS PS1 | 0 | 1 | 1 | 0 | 0 | 0 | 0 | 0 | 60H |
| PS2 | 0 | 1 | 0 | 0 | 0 | 0 | 0 | 0 | 40H |
| PS3 | 0 | 1 | 0 | 1 | 0 | 0 | 0 | 0 | 50H |
| PS4 | 0 | 0 | 0 | 1 | 0 | 0 | 0 | 0 | 10H |
| PS5 | 0 | 0 | 1 | 1 | 0 | 0 | 0 | 0 | 30H |
| PS6 | 0 | 0 | 1 | 0 | 0 | 0 | 0 | 0 | 20H |

POLYPHASE MOTOR DRIVING APPARATUS, POLYPHASE MOTOR DRIVING APPARATUS DRIVING METHOD AND POLYPHASE MOTOR SYSTEM

BACKGROUND OF THE INVENTION

The present invention relates to a polyphase motor (such as a two-phase, three-phase or four-phase motor) driving apparatus and the driving method thereof.

In case of controlling the speed/torque of, for example, a conventional three-phase motor, as seen in the driving of an inverter in an induction motor or synchronous motor, there have been employed a method of chopping six switching elements which are constituent elements of an H-type bridge circuit by high frequency, changing current carrying duty, generating and driving a sine wave current and controlling the frequency of the pseudo-sine wave without detecting the position of a rotor, and a driving method, referred to as a six-step inverter driving method, of applying a rectangular wave voltage to a three-phase coil terminal for every 120°. To control the speed/torque of the motor, the frequency of an applied voltage is changed or a voltage between very low resistors connected in series with the respective phase coils is fed back by a control method referred to as PWM (pulse width modulation) control to interrupt main current, thereby changing an average current value.

In case of, for example, a three-phase motor control system which is not shown, transistors are connected between a terminal +E and a ground and coils of the motor in respective phases are connected to the nodes among the transistors. A speed instruction pulse for controlling rotation speed is inputted from a microcomputer to an AND gate circuit and the rotation position of the motor is detected by a position detection signal generating circuit having hole elements every time a rotor rotates by 30 degrees. A position detection signal generated therefrom is inputted to the AND gate circuit through a delay circuit. The delay circuit is intended to control the position detection signal to delay the signal to thereby adjust timing for supplying the position detection signal to the AND gate circuit. The delay quantity is controlled by the microcomputer, depending on a loaded state or an accelerated state.

The AND gate circuit obtains the logical product between the speed instruction pulse from the microcomputer and the position detection signal from the delay circuit and outputs the logic product output to a six-step ring counter. The ring counter sequentially changes outputs to the six output lines according to the input of the logic product output from the AND gate circuit to the counter repeatedly to thereby supply the outputs to an inverter IC. The inverter IC takes in the outputs from the ring counter, to thereby switching-control the respective transistors so that the transistors operate in accordance with the order of phase excitation steps or the reversed step order.

If the driving circuit stated above is employed, it is possible to synchronize the rotation position of the rotor of the motor with the speed instruction pulse in the AND gate circuit.

Further, in a three-phase brushless motor, transistors connected in series with coils corresponding to three position detection elements are switching-controlled by the outputs of the position detection elements so that the rotation speed matches with the torque of the load. The PWM control is widely used for this speed control as well.

Namely, in the conventional three-phase motor, Y or Δ connected lead lines in A, B and C phases are connected to the nodes of the transistors in the serial circuit, respectively and the directions of voltages between the lead lines are changed to forward or backward directions to drive-control the motor or a one-phase excitation or one to two-phase excitation system for sequentially turning on/off the three elements is used to drive-control the motor.

In those cases, however, since control over the high-side transistors is very complicated, an inverter IC requires transmitter circuits and transformers. Thus, the conventional control system has disadvantages in that circuit space widens and cost increases. Moreover, torque variation is large in the one-phase excitation type driving system. Due to this, the conventional control system has disadvantages in that efficiency is lowered and the motor for generating the same torque is made large in size. Besides, it is required to provide three position detecting sections such as hole ICs within the motor. Thus, motor space disadvantageously increases to thereby make the motor large in size.

Furthermore, in the conventional three-phase motor system, the driving transistors are not necessarily turned on/off instantly at a timing at which a signal is transmitted from the position detection elements. Due to this, the present, precise position of the rotor does not reflect the timing of switching the phase of a driving signal in a real time manner. As a result, it is not possible to supply a driving signal to the stator at optimum timing in consideration of the present rotor position, so that the conventional system cannot obtain the highest efficiency.

BRIEF SUMMARY OF THE INVENTION

It is, therefore, an object of the present invention to provide a polyphase motor driving apparatus and a driving method thereof capable of constantly realizing optimum rotation efficiency irrespective of the variation of the load of the motor by supplying driving output at optimum timing based on the present position of a rotor.

The present invention relates to a polyphase motor driving apparatus characterized by comprising a receiving function means for receiving a pulse signal from a position detector which is connected to a rotary shaft of a rotor (having a plurality of poles) of a polyphase motor provided with a stator having a plurality of poles and which generates the pulse signal every time the rotor rotates by an electric angle of $360°/n$, where n is a positive integer; and a supply function for judging a present position of the rotor every time one pulse of the pulse signal is received, and for supplying a polyphase current to the polyphase motor at a timing based on the judgement, thereby switching an excitation phase of the polyphase motor and rotating the rotor.

According to the driving apparatus of the present invention, every time a pulse is transmitted from the position detector, the present rotation angle of the rotor is judged and driving power based on the judgment is supplied to the stator. Due to this, the applied power turns into a rotation torque most efficiently and the driving apparatus can be, therefore, informed of the optimum rotation angle of the rotor from the pulse transmitted from the position detector. This makes it possible to constantly supply driving power at optimum timing. Thus, even if a load is applied to the motor and the speed of the motor is decreased, for example, the pulse from the position detector allows always informing the present angle of the rotor irrespectively of the rotation speed, whereby it is possible to supply driving power at optimum timing. Strictly speaking, based on not only the timing of the pulse from the position detector but also on the present rotation speed which can be determined by counting pulses, the driving apparatus appropriately waits and then supplies driving power. It is, therefore, possible to supply driving power at optimum timing whether the rotation speed is fast or slow.

In the conventional polyphase motor driving apparatus, a signal from an encoder only recognizes rotation speed. Due to this, the conventional apparatus cannot realize the supply of driving power at optimum timing unlike the present invention and, therefore, cannot expect the same rotation efficiency as that of the present invention.

Further, according to another aspect of the present invention a polyphase motor driving apparatus is characterized by comprising a polyphase motor having a rotor provided with a rotary shaft and a plurality of permanent magnets connected to a circumference of the rotary shaft; and an annular stator rotatably holding the rotor, provided to surround the rotor and having n phases and n×m magnetic poles, where n is an integer not less than 3 and m is an integer not less than 1, a coil having a first end connected to a common terminal (+$E_2$) and wound around each of n pairs of the adjacent magnetic poles so that one of each pair of the magnetic poles serves as a first polarity and the other magnetic pole serves as a second polarity different from the first polarity, and wherein a magnetic field to rotate the rotor is generated by applying a voltage having the n-phases between the common terminal and a second end of the coil of each of the pairs; means for receiving a pulse signal from a position detector which is connected to the rotary shaft of the rotor of the polyphase motor and which generating the pulse signal every time the rotor rotates by an electric angle of 360°/n, where n is a positive integer; and means for judging a present position of the rotor every time one pulse of the pulse signal is received, and for supplying a polyphase current to the polyphase motor at a timing based on the judgment, thereby switching an excitation phase of the polyphase motor and rotating the rotor.

With the above constitution, the present invention can provide not only the above function and advantage of the first embodiment but also a polyphase motor driving system in which the number of switching elements such as transistors can be halved since the rotor rotates only with a one-directional polyphase current by winding a coil around the magnetic poles to excite adjacent magnetic poles of the stator of the polyphase motor with different magnetism. This makes it possible to constantly obtain the highest rotation efficiency irrespectively of the variation of load and to provide a polyphase motor driving system capable of further reducing circuit space and component cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 shows the constitution of a table storing information on excitation phase statuses set in a microcomputer in the first embodiment;

FIG. 12 shows the constitution of a table storing phase current average values and duty ratios corresponding to torque levels set in the microcomputer in the first embodiment;

FIG. 13 shows the constitution of a table storing addresses equivalent to the torque levels set in the microcomputer in the first embodiment and their corresponding duty ratios;

FIG. 24 is an operation sequence showing the polarity of each phase of the three-phase motor;

FIG. 25 shows the relationship between the outputs of the output ports of the microcomputer and excitation phase statuses PS1 to PS6 when the motor is rotated by switching an excitation phase; and FIG. 26 shows the relationship between the outputs of the output ports of the microcomputer and excitation phase statuses PS1 to PS6 when the motor is rotated by switching an excitation phase.

DETAILED DESCRIPTION OF THE INVENTION

The embodiments according to the present invention will be described in detail with reference to the accompanying drawings.

First Embodiment

The first embodiment discloses a polyphase motor driving apparatus for conducting an interruption processing for each pulse signal supplied from a position detector which is one of the characteristic feature of the present invention and for switching a phase according to the present position of a rotor. It is noted that this embodiment concerns a case where a three-phase motor is used as a polyphase motor.

Figure 2:
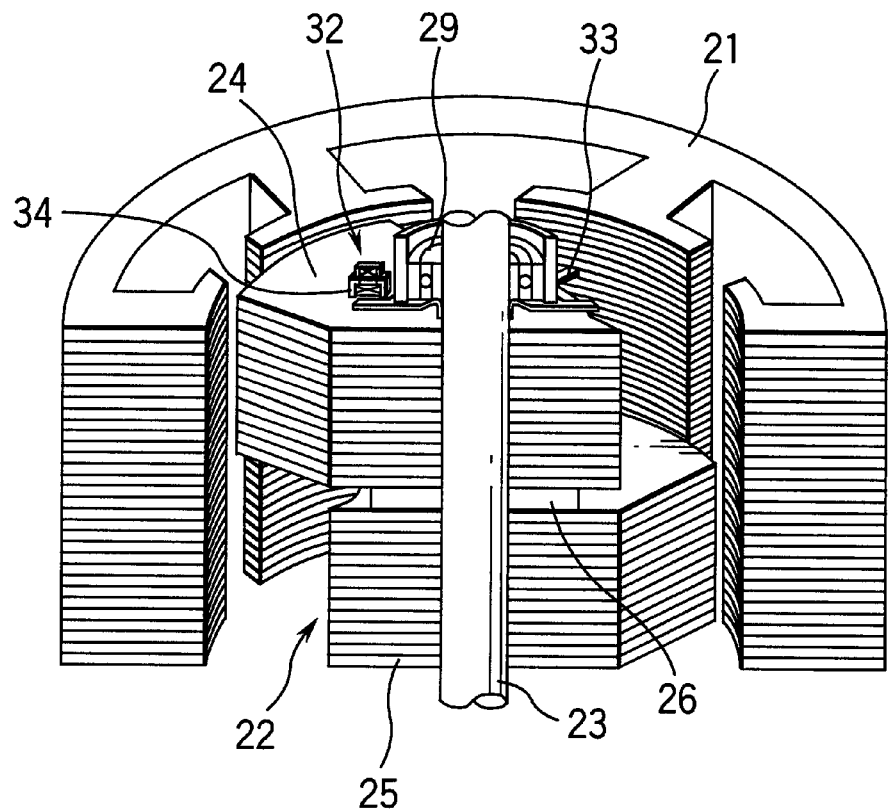
FIG. 2 is a perspective view showing the rotor and stator of a three-phase motor in the first embodiment according to the present invention while cutting the rotor and stator longitudinally.
Figure 4:
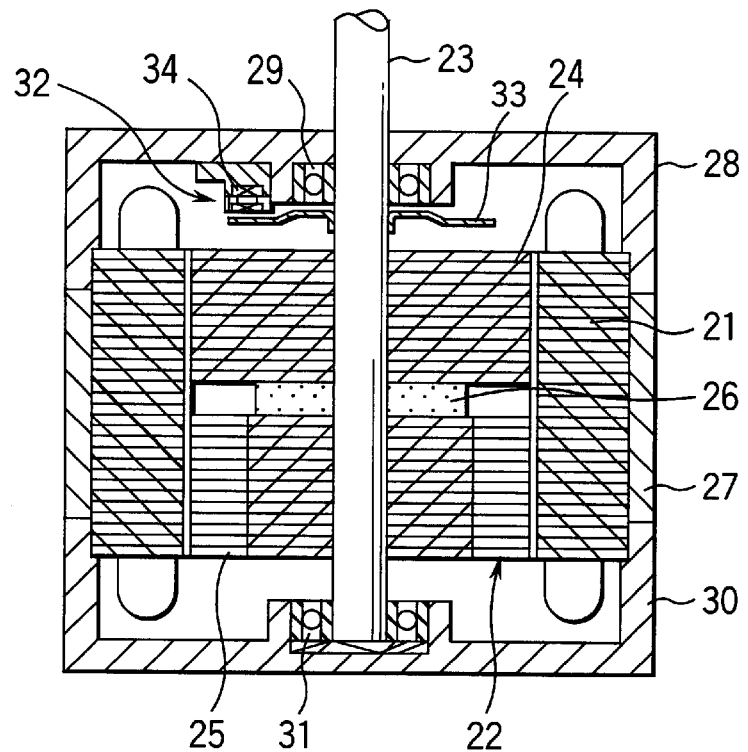
FIG. 4 is a longitudinal sectional view showing the entire three-phase motor in the first embodiment.
Figure 5:
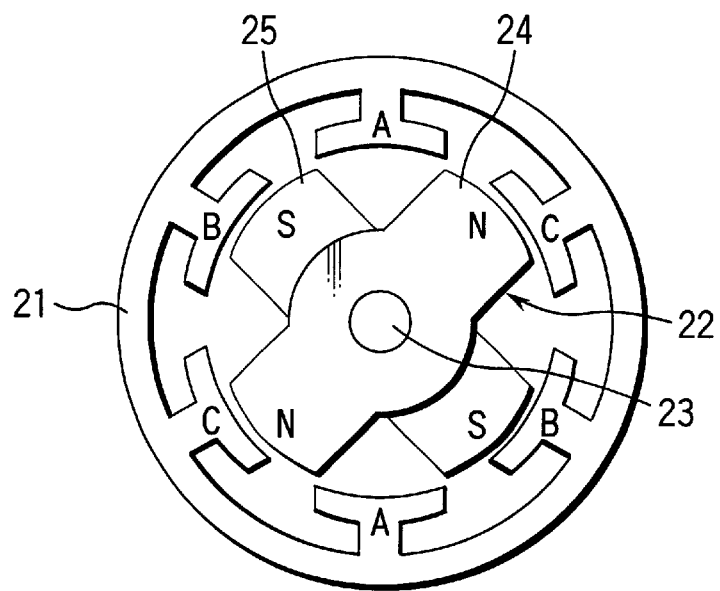
FIG. 5 is a plan view showing the relationship between the magnetic poles of the rotor of the three-phase motor and the excitation phase of the stator thereof in the first embodiment.

FIG. 2 is a perspective view showing a rotor and a stator cut longitudinally. FIG. 4 is a longitudinal cross-sectional view of the overall three-phase motor. FIG. 5 is a plan view showing the relationship between the magnetic poles of the rotor and the excitation phase of the stator. FIG. 5 shows a stator 21 having six magnetic poles arranged at intervals of 60 degrees, a coil wound about each pole in a concentrated manner and A phase, B phase, C phase, A phase, B phase and C phase formed counterclockwise. A four-pole convex rotor 22 is fixed to a rotary shaft 23 and rotatably arranged in the stator 21.

The convex rotor 22 is formed integrally with the rotary shaft 23 by superposing crisscross a pair of I-type layered cores 24 and 25 through a circular rare earth magnet 26 such as a samarium-cobalt magnet magnetized in axial direction. The upper I-type core 24 forms N poles and the lower I-type core 25 forms S poles.

The stator 21 is fixedly housed in a cylindrical central casing 27. The convex rotor 22 is housed in the stator 21 and one end of the rotary shaft 23 is rotatably supported by a bearing 29 attached to the central portion of a concave end portion casing 28 provided at one end of the central casing 27 and the other end of the rotary shaft 23 penetrates into and is rotatably supported by a bearing 31 attached to the central portion of a concave end portion casing 30 provided at the other end of the central casing 27.

Figure 3:
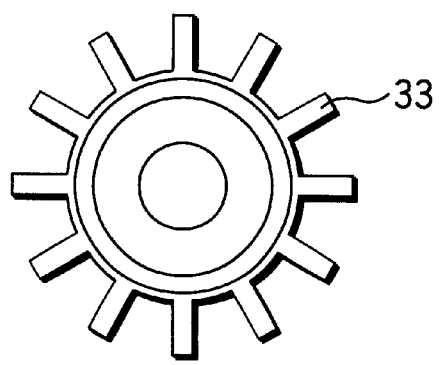
FIG. 3 shows the constitution of a disk-shaped magnetic body of a position detector used in the first embodiment.

A position detector 32, serving as position detecting means for detecting the position of the convex rotor 22 and generating a pulse signal, is housed in a space between the other end-side convex rotor 22 and the end portion casing 28. As shown in FIG. 3, the position detector 32 has a constitution in which a disk-shaped magnetic body 33 having twelve convex portions at a pitch of an electric angle of 60° (angle of 30°) on its outer periphery is fixed to the rotary shaft 23 of the convex rotor 22, a search coil is wound around a yoke core formed out of a permanent magnet and the magnetic body into a U shape on the inner wall of the end portion casing 28 and a detection element 34 detecting the change of the magnetic resistance due to the passage of the respective convex portions of the disk-shaped magnetic body 33 and outputting a signal is provided.

The convex portions of the disk-shaped magnetic body 33 may be either extended toward the outer periphery of the convex rotor 22 as shown in FIG. 3 or folded toward the other end of the rotary shaft. In the latter case, the detection element 34 is arranged laterally.

If motors are classified by structures, this three-phase motor can be regarded as a kind of a three-phase hybrid-type stepping motor. The motor conducts two-phase excitation control in accordance with a sequence shown in FIG. 24. If the excitation order is reversed, the rotation of the motor can be reversed.

Figure 6:
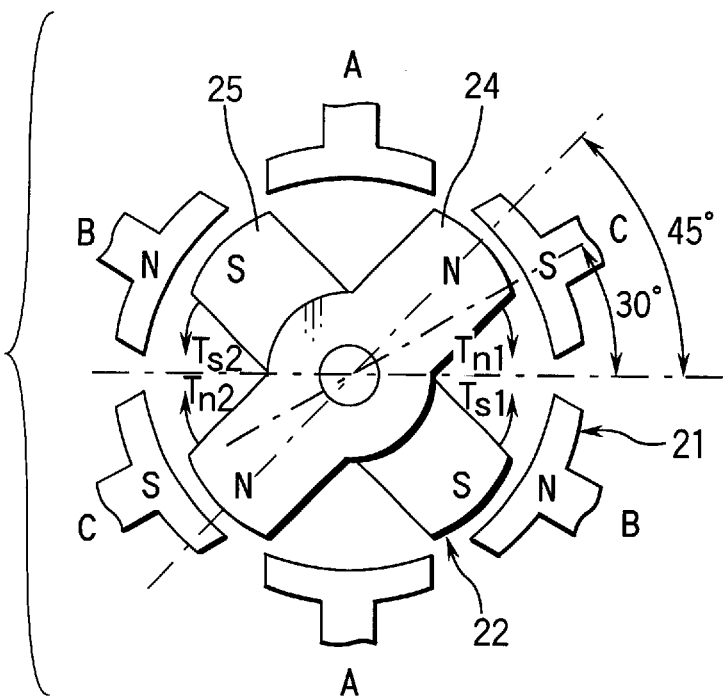
FIG. 6 is a plan view showing the relationship among the magnetic poles of the rotor, the excitation phase of the stator and generated torques in a state in which the three-phase motor is balanced in the first embodiment.

FIG. 6 shows the balanced state of the convex rotor 22 while the A phases of the stator 21 are de-excited, the B phases are N poles and the C phases are S poles. This corresponds to a state in step 1 or 7 shown in FIG. 24. As indicated by an arrow in FIG. 6, a clockwise torque Tn1 occurs to the N pole facing one of the C phases of the stator pole. A counterclockwise torque Ts1 occurs to the S pole facing one of the B phases of the stator pole. A clockwise torque Tn2 occurs to the N pole facing the other C phase of the stator pole. A counterclockwise torque Ts2 occurs to the S pole facing the other B phase of the stator pole. Thus, the rotor 22 is kept balanced.

Figure 7:
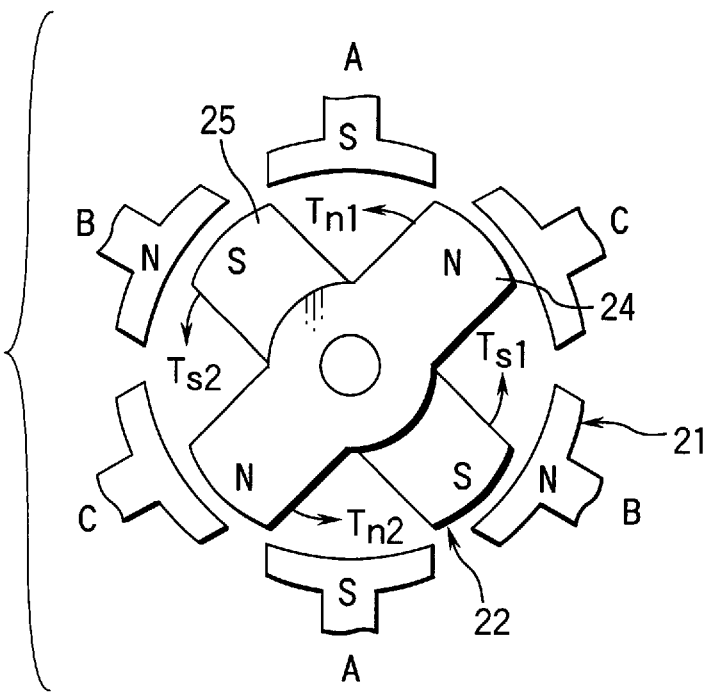
FIG. 7 is a plan view showing the relationship among the magnetic poles of the rotor, the excitation phase of the stator and generated torques while the three-phase motor is rotating in the first embodiment.

In the balanced state shown in FIG. 6, if the two-phase excited state is changed to the state of a step 2 in FIG. 24, i.e., B phases remain N poles, A phases are S poles and C phases are de-excited, then the directions of the torques Tn1 and Tn2 occurring to the N poles of the convex rotor 22 are reversed as shown in FIG. 7 and torques rotating the convex rotor 22 counterclockwise occur. The torque generated at this time is the largest torque among those generated when the convex rotor 22 is in other positions. Therefore, if the driving apparatus controls the rotor 22 so that the highest current carries across the A phases when the convex rotor 22 arrives at the position shown in FIG. 6, it is possible to obtain the highest efficiency. In contrast, only a copper loss occurs by keeping exciting the B and C phases even if the convex rotor 22 arrives at the position shown in FIG. 6.

Figure 8:
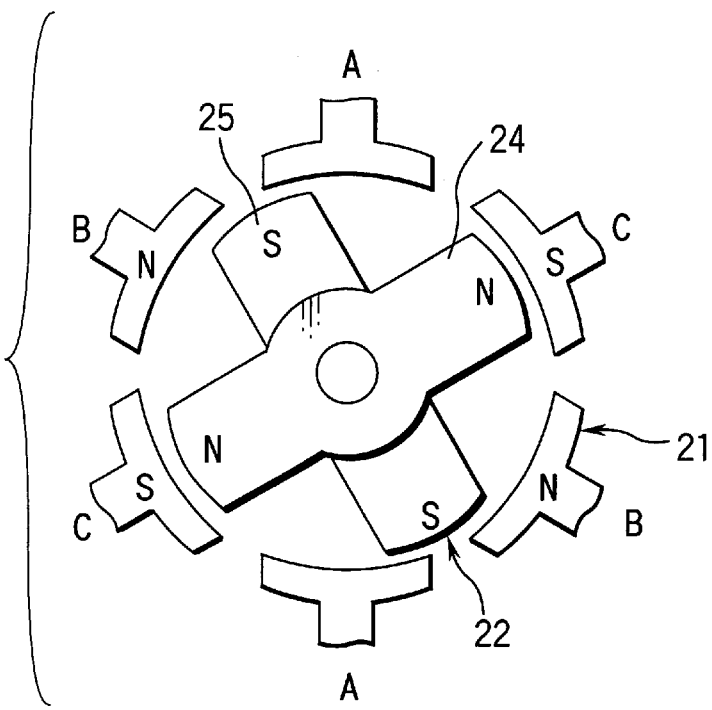
FIG. 8 is a plan view showing a state in which the N poles of the rotor of the three-phase motor face the magnetic poles of the stator by one-on-one correspondence in the first embodiment.
Figure 9:
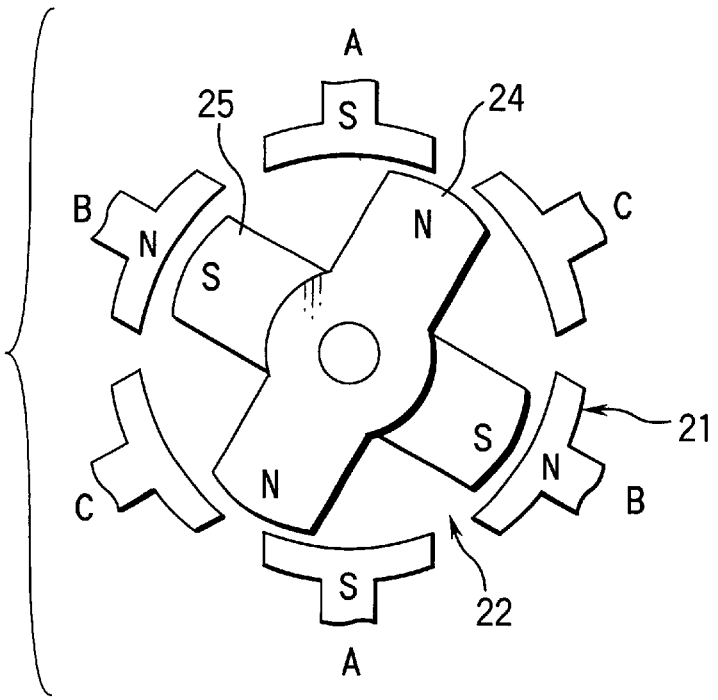
FIG. 9 is a plan view showing a state in which the S poles of the rotor of the three-phase motor face the magnetic poles of the stator by one-on-one correspondence in the first embodiment.

Further, if the N poles of the convex rotor 22 face the magnetic poles of the stator 21 by one-on-one correspondence as shown in FIG. 8 or the S poles of the convex rotor 22 face the magnetic poles of the stator 21 by one-on-one correspondence as shown in FIG. 9, then the occurrence of torque is reduced by almost half, so that it is possible to generate the highest torque by switching excitation when the stator is at that position. That is, the position detector 32 detects that the convex rotor 22 reaches this position, generates a pulse signal every time the convex rotor 22 rotates by 30° (or electrical angle of 60°) to cause the microcomputer to conduct external interruption processing and to switch the excitation phase and correct excitation time. In interruption processing, wait time according to the rotation speed of the three-phase motor is set based on a pulse signal from the position detector 32 and time for starting switching an excitation phase is thereby adjusted.

Figure 1:
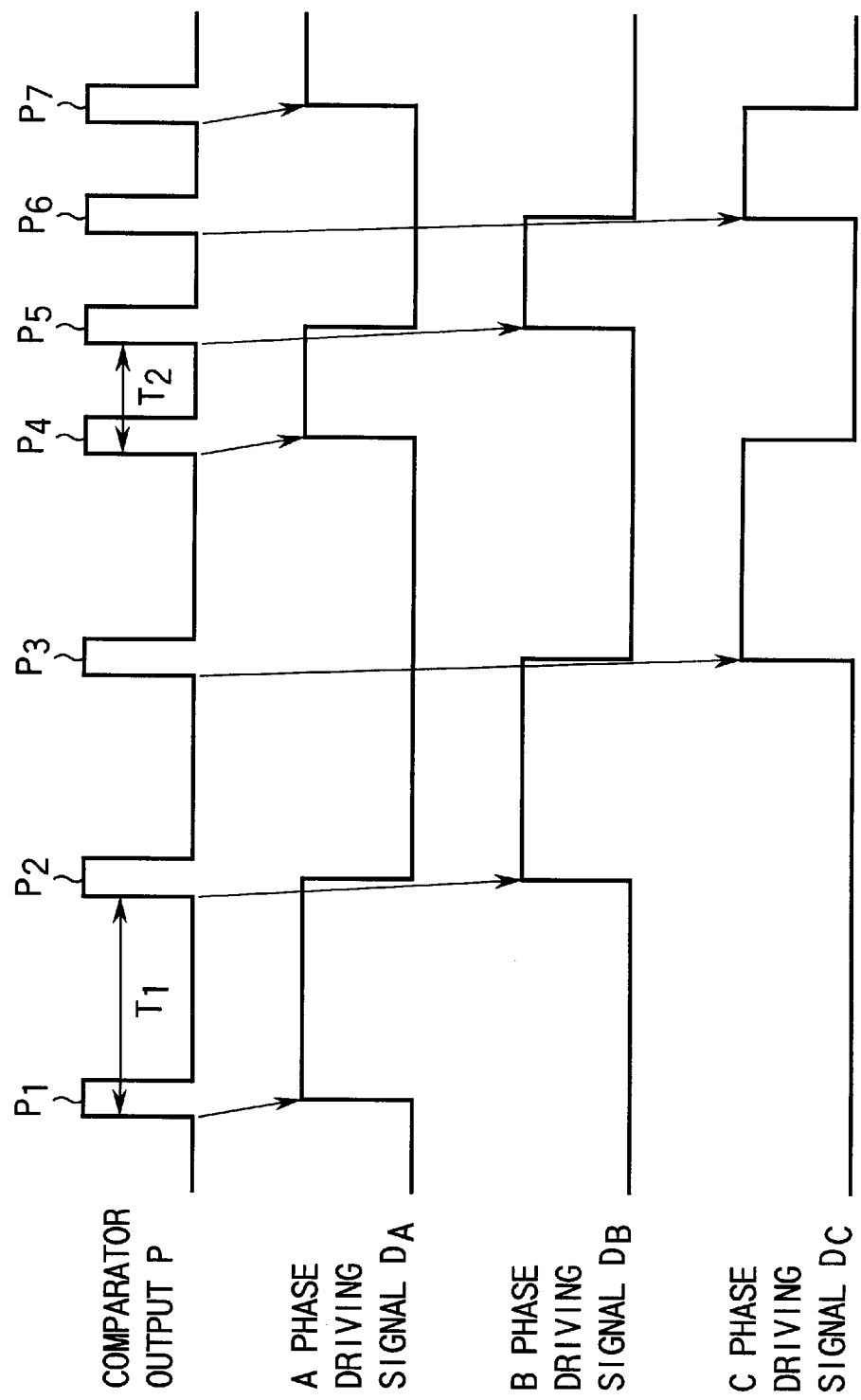
FIG. 1 is a graph showing a case where the rotation of a polyphase motor is controlled by a driving apparatus according to the present invention.
Figure 10:
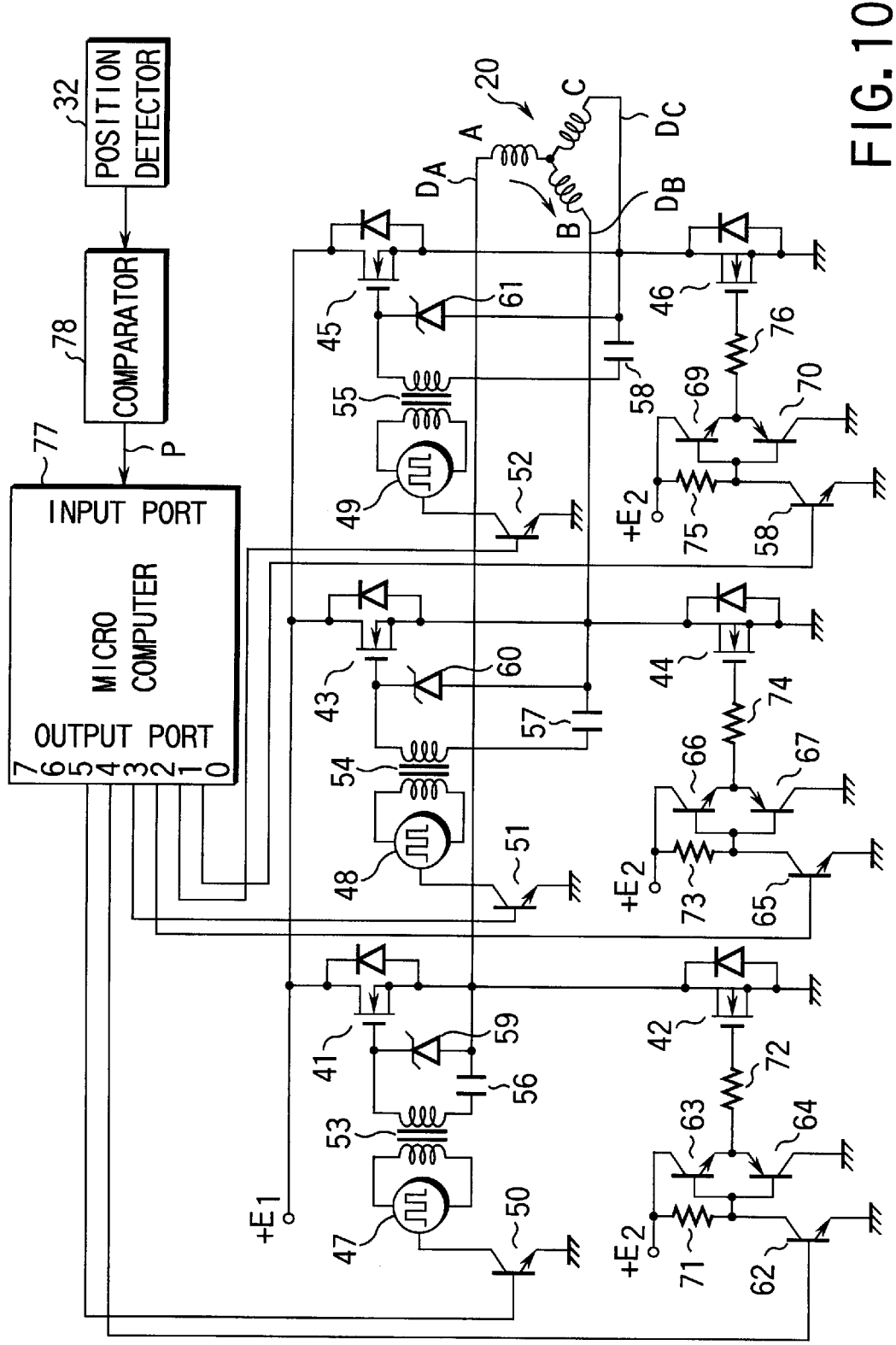
FIG. 10 is a circuit block diagram of the three-phase motor driving apparatus in the first embodiment.

FIG. 1 is a graph showing a case where the switching of the phase of the rotor of the polyphase motor is controlled by the driving apparatus of the present invention. FIG. 10 is a circuit diagram showing the driving apparatus for the three-phase motor 20.

In FIG. 1, it is found that the polyphase motor driving apparatus in the first embodiment according to the present invention controls the rotation of the motor 20 by switching a phase such as from the A phase to the B phase, from the B phase to the C phase, every time the apparatus receives a pulse signal from a comparator. Thus, even if the rotation in a period from pulses $P_1$ to $P_3$ is changed to the rotation in a period from pulses $P_4$ to $P_7$ because of a weak load applied to a rotating member, every pulse is outputted so as to switch an excitation phase, thereby ensuring output at the optimum position of the rotor and preventing the decrease of an efficiency because of the optimal switching load.

In FIG. 10, between a terminal $+E_1$ and a ground, a series circuit consisting of the first FET (field effect transistor) 41 and the second FET 42 is connected, a series circuit consisting of the third FET 43 and the fourth FET 44 is connected and a series circuit consisting of the fifth FET 45 and the sixth FET 46 is connected. An A-phase coil of the three-phase motor 20 is connected to the node between the first FET 41 and the second FET 42 and an output $D_A$ is outputted to the node. A B-phase coil is connected to the node between the third FET 43 and the fourth FET 44 and an output $D_B$ is outputted to the node. A C-phase coil is connected to the node between the fifth FET 45 and the sixth FET 46 and an output $D_C$ is outputted to the node.

Transmitter circuits 47, 48 and 49 corresponding to the first, third and fifth FETs 41, 43 and 45, respectively are provided. The transmitter circuits 47, 48 and 49 are controlled to be driven or stopped by the on/off operations of the first, second and third NPN transistors 50, 51 and 52, respectively. The outputs transmitted from the transmitter circuits 47, 48 and 49 are supplied to primary coils of the transformers 53, 54 and 55, respectively.

The secondary coils of the transformers 53, 54 and 55 are connected between the gates and sources of the FETS 41, 43 and 45 through capacitors 56, 57 and 58, respectively. Reference diodes 59, 60 and 61 are connected between the gates and sources of the FETs 41, 43 and 45, respectively.

The fourth NPN transistor 62 and a series circuit consisting of the fifth NPN transistor 63 and the sixth PNP transistor 64 are provided in a corresponding manner to the second FET 42. The seventh NPN transistor 65 and a series circuit consisting of the eighth NPN transistor 66 and the ninth PNP transistor 67 are provided in a corresponding manner to the fourth FET 44. The tenth NPN transistor 68 and a series circuit consisting of the eleventh NPN transistor 69 and the twelfth PNP transistor 70 are provided in a corresponding manner to the sixth FET 46.

The collector of the fourth transistor 62 is connected to a terminal $+E_2$ through a resistor 71 and to the bases of the fifth and sixth transistors 63 and 64, and the emitter of the fourth transistor 62 is grounded. In the series circuit of the fifth and sixth transistors 63 and 64, the collector of the transistor 63 is connected to the terminal $+E_2$, the collector of the transistor 64 is grounded and the node between the emitters of the transistors 63 and 64 is connected to the gate of the second FET 42 through a resistor 72.

The collector of the seventh transistor 65 is connected to the terminal $+E_2$ through a resistor 73 and to the bases of the eighth and ninth transistors 66 and 67, and the emitter of the seventh transistor 65 is grounded. In the series circuit of the eighth and ninth transistors 66 and 67, the collector of the transistor 66 is connected to the terminal $+E_2$, the collector of the transistor 67 is grounded and the node between the emitters of the transistors 66 and 67 is connected to the gate of the fourth FET 44 through a resistor 74.

The collector of the tenth transistor 68 is connected to the terminal $+E_2$ through a resistor 75 and to the bases of the eleventh and twelfth transistors 69 and 70, and the emitter of the tenth transistor 68 is grounded. In the series circuit of the eleventh and twelfth transistors 69 and 70, the collector of the transistor 69 is connected to the terminal $+E_2$, the collector of the transistor 70 is grounded and the node between the emitters of the transistors 69 and 70 is connected to the gate of the sixth FET 46 through a resistor 76.

Meanwhile, the driving apparatus is provided with a microcomputer 77. A pulse signal from the position detector 32 is inputted to the input port of the microcomputer 77 through a comparator 78. The comparator 78 supplies a pulse signal as an index pulse to the microcomputer 77 when an input signal P is equal to or higher than a predetermined threshold level.

The microcomputer 77 is provided with output ports 7 to 0. A signal from the output port 5 is supplied to the base of the first transistor 50, a signal from the output port 4 is supplied to the base of the fourth transistor 62, a signal from the output port 3 is supplied to the base of the second transistor 51, a signal from the output port 2 is supplied to the base of the seventh transistor 65, a signal from the output port 1 is supplied to the base of the third transistor 52 and a signal from the output port 0 is supplied to the base of the tenth transistor 68.

In this driving apparatus, if the base voltage of the first transistor 50 is made a high (H) level, the transmitter circuit 47 starts operating to thereby apply a voltage between the gate and source of the first FET 41 and the FET 41 is turned on. If the base voltage of the seventh transistor 65 is made a low (L) level, the transistor 65 is turned off, whereby the eighth transistor 66 is turned on, the ninth transistor 67 is turned off and the fourth FET 44 is turned on. As a result, a current in direction indicated by an arrow shown in FIG. 10 carries across the phase A coil and the phase B coil of the three-phase motor 20 through the first FET 41 and the fourth FET 44, thereby simultaneously exciting the phases A and B.

Next, if the base voltage of the seventh transistor 65 is made a high (H) level, the transistor 65 is turned on, so that the eighth transistor 66 is turned off, the ninth transistor 67 is turned on and the fourth FET 44 is turned off at high speed. At the same time, if the base voltage of the tenth transistor 68 is made a low (L) level, the transistor 68 is turned off, so that the eleventh transistor 69 is turned on, the twelfth transistor 70 is turned off and the sixth FET 46 is turned on. As a result, the A phases remain unchanged, whereas the B phases are turned off and the C phases are turned on.

Furthermore, if the first transistor 50 is turned off, the gate potential of the first FET 41 is reduced to be lower than the source potential thereof to thereby turn off the FET 41, the second transistor 51 is turned on to thereby turn on the third FET 43, the seventh transistor 65 is turned on before turning on the third FET 43 and the fourth FET 44 is turned off, then the A phases are turned off and the B phases are turned on oppositely in polarity.

FIG. 25 shows the relationship between the outputs of the output ports of the microcomputer 77 and the excitation phase statuses PS1 to PS6 when the motor is rotated by switching an excitation phase in the notation of both the eight-bit binary number and hexadecimal number.

That is, in the excitation phase status PS1, the eight bits of the output ports 7 to 0 are "0, 0, 1, 1, 0, 0, 0, 1". In this status, the first transistor 50 is turned on, the fourth transistor 62 is turned off, the second transistor 51 is turned off, the seventh transistor 65 is turned off, the third transistor 52 is turned off, the tenth transistor 68 is turned on, the first FET 41 is turned on, the second FET 42 is turned off, the third FET 43 is turned off, the fourth FET 44 is turned on, the fifth transistor 45 is turned off and the sixth transistor 46 is turned off.

In the excitation phase status PS2, the eight bits of the output ports 7 to 0 are "0, 0, 1, 1, 0, 1, 0, 0". In this status, the first transistor 50 is turned on, the fourth transistor 62 is turned on, the second transistor 51 is turned off, the seventh transistor 65 is turned on, the third transistor 52 is turned off, the tenth transistor 68 is turned off, the first FET 41 is turned on, the second FET 42 is turned off, the third FET 43 is turned off, the fourth FET 44 is turned off, the fifth transistor 45 is turned off and the sixth transistor 46 is turned on.

In the excitation phase status PS3, the eight bits of the output ports 7 to 0 are "0, 0, 0, 1, 1, 1, 0, 0". In this status, the first transistor 50 is turned off, the fourth transistor 62 is turned on, the second transistor 51 is turned on, the seventh transistor 65 is turned on, the third transistor 52 is turned off, the tenth transistor 68 is turned off, the first FET 41 is turned off, the second FET 42 is turned off, the third FET 43 is turned on, the fourth FET 44 is turned off, the fifth transistor 45 is turned off and the sixth transistor 46 is turned on.

In the excitation phase status PS4, the eight bits of the output ports 7 to 0 are "0, 0, 0, 0, 1, 1, 0, 1". In this status, the first transistor 50 is turned off, the fourth transistor 62 is turned off, the second transistor 51 is turned on, the seventh transistor 65 is turned on, the third transistor 52 is turned off, the tenth transistor 68 is turned on, the first FET 41 is turned off, the second FET 42 is turned on, the third FET 43 is turned on, the fourth FET 44 is turned off, the fifth transistor 45 is turned off and the sixth transistor 46 is turned off.

In the excitation phase status PS5, the eight bits of the output ports 7 to 0 are "0, 0, 0, 0, 0, 1, 0, 1". In this status, the first transistor 50 is turned off, the fourth transistor 62 is turned off, the second transistor 51 is turned off, the seventh transistor 65 is turned on, the third transistor 52 is turned off, the tenth transistor 68 is turned on, the first FET 41 is turned off, the second FET 42 is turned on, the third FET 43 is turned off, the fourth FET 44 is turned off, the fifth transistor 45 is turned on and the sixth transistor 46 is turned off.

In the excitation phase status PS6, the eight bits of the output ports 7 to 0 are "0, 0, 0, 1, 0, 0, 1, 1". In this status, the first transistor 50 is turned off, the fourth transistor 62 is turned on, the second transistor 51 is turned off, the seventh transistor 65 is turned off, the third transistor 52 is turned on, the tenth transistor 68 is turned on, the first FET 41 is turned off, the second FET 42 is turned off, the third FET 43 is turned off, the fourth FET 44 is turned on, the fifth transistor 45 is turned on and the sixth transistor 46 is turned off.

If the excitation phase statuses PS1 to PS6 shown in FIG. 25 are executed in this order or the reversed order, the three-phase motor 20 can be rotated in arbitrary direction, forward or backward.

The excitation phase statuses are stored as a table 77a shown in FIG. 11 in an ROM of the microcomputer 77. That is, the table 77a stores data "31H", "34H", "1CH", "0DH", "05H" and "13H" at addresses F081 to F086, respectively and data "15H"for de-excitation is stored at addresses F080 and F087.

Figure 14:
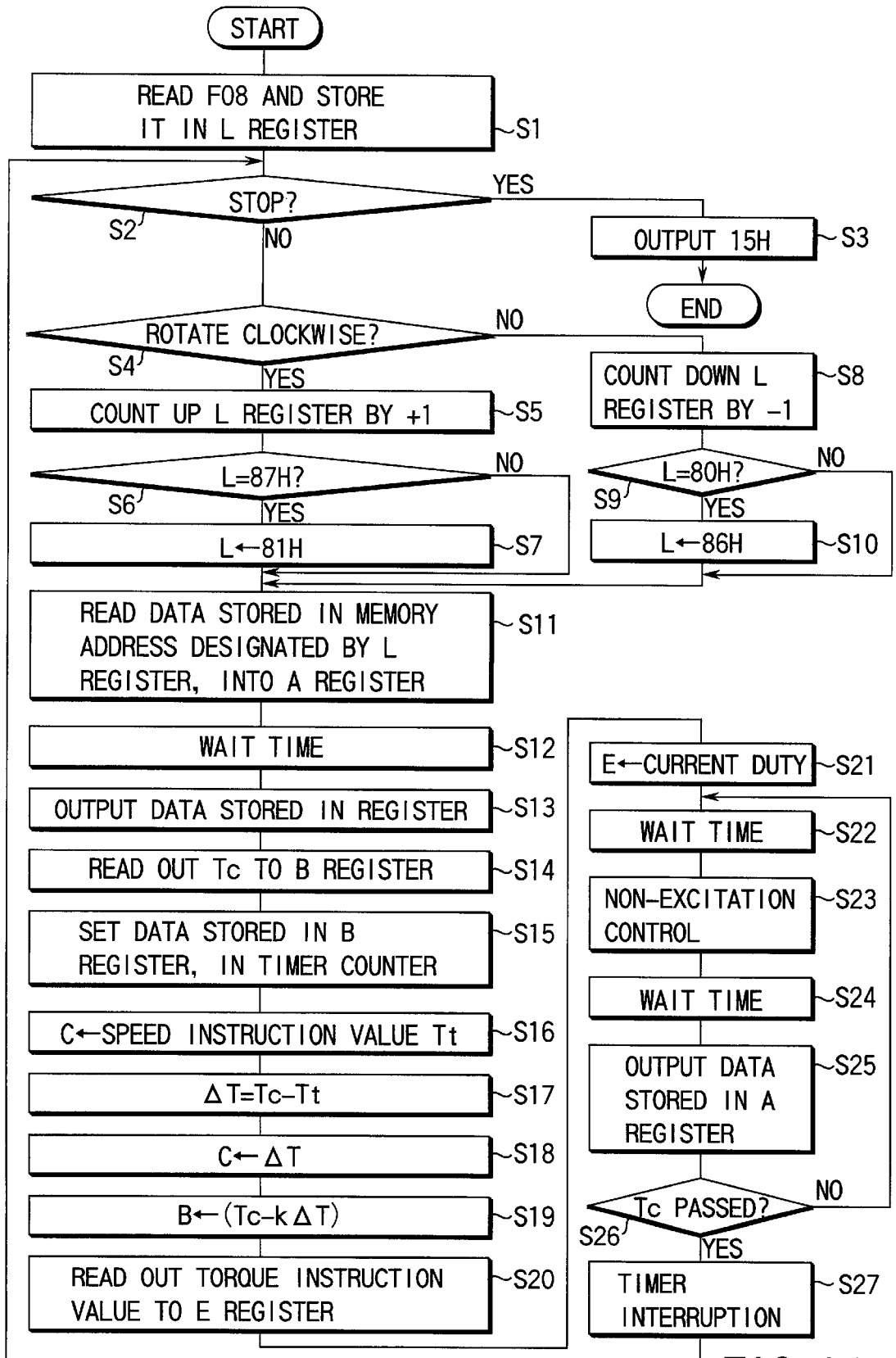
FIG. 14 is a flowchart showing the main processing of the microcomputer in the first embodiment.

The microcomputer 77 conducts main processing shown in FIG. 14. The microcomputer 77 also conducts index interruption processing shown in FIG. 15 if an index pulse is inputted from the comparator 78.

In the main processing shown in FIG. 14, when power is turned on, the microcomputer 77 reads data at an F083 address in an L register in an RAM, i.e., data "1CH" at, for example, the address F083 in an output status other than S1 and S6 from the table 77a shown in FIG. 11 in step S1. Next, it is determined whether an external signal instructs the motor to stop rotating to rotate in step S2. If the external signal instructs the motor to stop rotating, then the data "15H" at the address F087 is read in the L register, the data "15H", that is, "00010101" is outputted to the output ports 7 to 0, all of the FETs 41 to 46 are turned off and the processing is ended in step S3.

If it is determined that the external signal instructs the motor to rotate in step S2, the direction of the rotation is determined in step S4. If the rotation is clockwise, the data stored in the L register is incremented in step S5. In step S6, it is determined whether or not the data stored in the L register reaches that at the address F087 for de-excitation. In case of the address F087, the data stored in the L register is replaced by the data at the address F081H in step S7. If the rotation is counterclockwise, the data stored in the L register is decremented in step S8. In step S9, it is determined whether or not the data stored in the L register returns to the data at the address F080 for de-excitation. In case of the address F080, the data stored in the L register is replaced by the data at an address F086H.

In step S11, the data (memory data) at an address in the ROM designated by the L register is read into an A register in the RAM. In step S12, wait time is given by a software timer. In step S13, the data stored in the A register is outputted to the output ports.

Next, in step S14, excitation time Tc stored in advance as an initial condition is read into a B register in the RAM. In step S15, the data Tc stored in the B register is set into a timer counter. By setting the data Tc into the timer counter, timer interruption is carried out after the passage of the time Tc.

Thereafter, in step S16, a speed instruction value applied as an external signal to the microcomputer 77 is read into a C register in the RAM. This speed instruction value is given as the time interval Tc of the outputs of pulses at an electric angle 60° obtained after the detection element 34 of the position detector 32 detects the protrusions of the disk-shaped magnetic body 33.

In step S17, the data stored in the C register is subtracted from that stored in the B register and a deviation $\Delta T = Tc - Tt$ from a target time is obtained. The result is stored in the C register in step S18. The deviation $\Delta T$ becomes a maximum at the start and if the speed exceeds a designated speed or time interval, the deviation $\Delta T$ becomes negative.

In step S19, $K \cdot \Delta T$ is subtracted from the data Tc stored in the B register. The result is stored as new data Tcs in the B register. Reference symbol K is a positive number not more than 1 determined by the values Tt and $\Delta T$.

By performing the operation of $Tcs = Tc - K \cdot \Delta T$, the excitation time for each phase is adjusted every time a phase is switched and subjected to feedback control so as to coincide with a target speed.

Next, torque control is conducted. Namely, in step S20, a torque instruction value applied as an external signal to the microcomputer 77 is read into an E register in the RAM.

Figure 16:
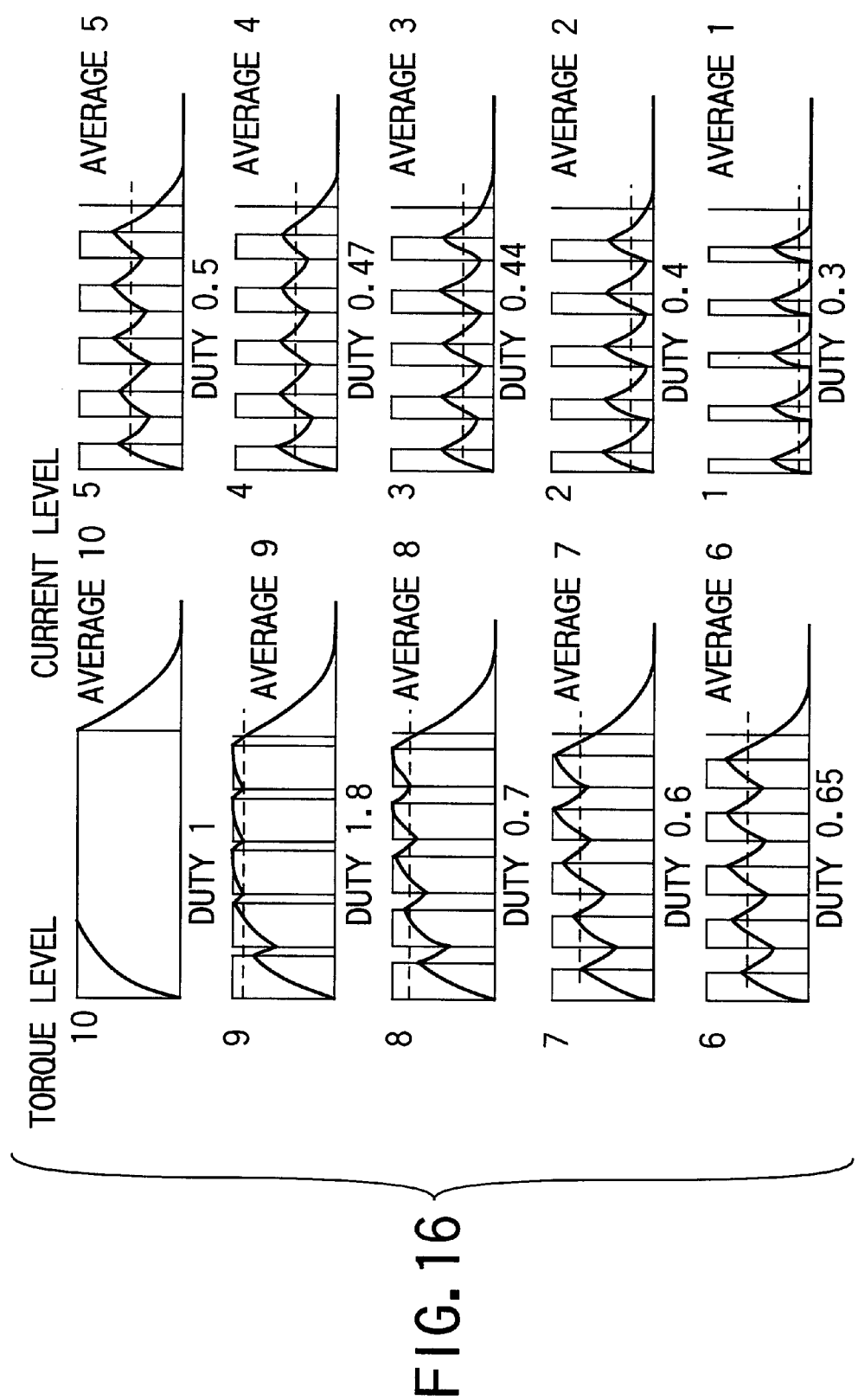
FIG. 16 is a carrying current waveform view showing an example of duty ratio settings in the first embodiment.

A table 77b storing phase current average values and duty ratios corresponding to the torque levels 10 to 1 shown in FIG. 12, is provided in the ROM of the microcomputer 77. Also, a table 77c storing duty ratios corresponding to addresses F111 to F11A equivalent to the torque levels shown in FIG. 13 is provided in the ROM of the microcomputer 77. That is, as the address increases from F111 to F11A, a duty ratio is increased from 0.3 to 1. Here, a duty ratio means a ratio of a time period in which a voltage is applied, to the entire excitation period, one example of which is shown in FIG. 16.

That is, the entire excitation time is divided into arbitrary intervals almost equally. The average current value at the entire excitation time when voltage application duties in the respective intervals are changed, is set so that the average value is proportional to a torque level. Thus, the duty ratio varies according to the coil inductance of the control target or the motor. FIG. 16 shows a case where the entire excitation time is divided into five intervals.

Next, in step S21, the duty ratio of the current carrying time to the torque instruction value is read into an E register. In step S22, wait time is given by the software timer. In step S23, data "15H" is outputted to the output ports to conduct de-excitation control. In step S24, wait time is given by the software timer. In step S25, the data stored in the A register is outputted to the output ports to conduct excitation control. In step S26, it is determined whether or not the excitation time Tc of the entire excitation period elapses. If the excitation time Tc does not elapse, the processing returns to step S22 and waits. That is, using the software timer, keeping time intervals between the de-excitation state and the excitation return state, de-excitation control and excitation control are repeatedly conducted.

Thereafter, the excitation time Tc of the entire excitation period elapses, timer interruption is executed in step S27 and the processing returns to step 2 for determining whether an external signal indicates the motor to stop rotating or rotate.

Figure 15:
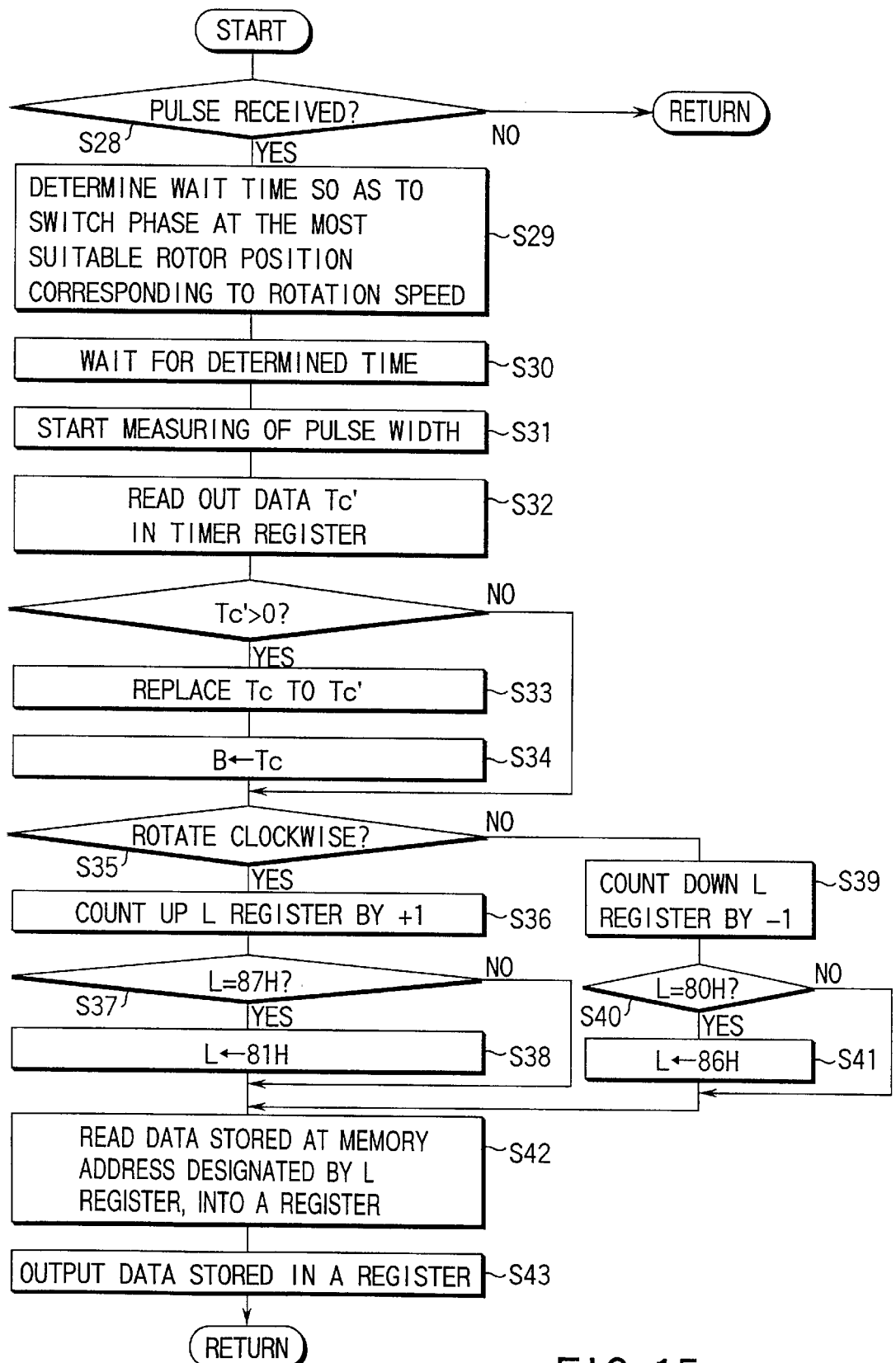
FIG. 15 is a flowchart showing the index interruption processing of the microcomputer in the first embodiment.

While the above-stated main processing is being carried out, if the apparatus receives an index pulse signal from the position detector 32 through the comparator 78, index interruption processing shown in FIG. 15 is executed (in step S28). As a result, it is possible to switch an excitation phase for each pulse signal. Thus, even if a load is changed and rotation speed is temporarily changed, data can be outputted to the respective phases at an optimum rotor position and the three-phase motor can be driven without the decrease of an efficiency irrespectively of the variation of the load.

In this index interruption processing, after the excitation phase is switched and output data is changed, the processing returns to the main routine.

Namely, in step S30, the computer 77 waits for a predetermined time determined so that excitation can be started at optimum timing corresponding to the data Tc stored in the B register (time wait adjusting means). In step S31, the pulse width from an index pulse to the next index pulse is measured and a measurement value Tc' is stored in a timer register. Next, the data Tc' stored in the timer register is read in step S32. If Tc'>0, the value Tc of the timer counter is replaced by Tc' and the new Tc is stored in the B register in step S34.

Thereafter, it is determined whether the rotation of the motor is clockwise or counterclockwise. If the rotation is clockwise, the data of the L register is incremented in step S36. In step S37, it is determined whether or not the data stored in the L register reaches the data for de-excitation at the address F087. In case of the data at the address F087, the data stored in the L register is replaced by data at the address F081H. If the rotation is counterclockwise, the data stored in the L register is decremented in step S39. In step S40, it is determined whether or not the data stored in the L register returns to the data for de-excitation at the address F080. In case of the data at the address F080, the data stored in the L register is replaced by data at the address F086H in step S41.

Next, in step S42, the data (memory data) at an address in the ROM designated by the L register is read into the A register. In step S43, the data stored in the A register is outputted to the output ports and the processing returns to the main routine.

With the constitution stated above, the position detector 32 detects a positional relationship between the convex rotor 22 and the stator 21 so that the torque generated at the motor 20 is not more than a constant value at every electric angle of 600 and the detection output is taken by the microcomputer 77 as an index pulse. The microcomputer 77 directly on/off controls the FETs 41 to 46 and the transistors 50, 51, 52, 62, 65 and 68 by conducting interruption processing to thereby switch phase current. This makes it possible to dispense with an inverter IC or the like requiring a wide arrangement space, to make the circuit space smaller and to reduce cost.

The position detector 32 detects a position every time the convex rotor 2 rotates by an electric angle of 60° and the microcomputer 77 inputs an index pulse through the comparator 78. The microcomputer 77 counts the time width of inputted index pulses. Using the deviation quantity between the time width and target time determined by the speed instruction value, the computer 77 performs the arithmetic operation of appropriate excitation time for the next phase. If the detected time is longer than the target time, the computer 77 makes an adjustment to increase the excitation time. Conversely, if the detected time is shorter than the target time, the computer 77 makes an adjustment to decrease the excitation time and controls rotation speed. Further, data indicating the relationship of a duty ratio of the current value corresponding to a generated torque to a current is stored as a ratio table in the ROM and the current duty is changed based on the deviation quantity between the target torque and the generated torque to thereby conduct torque control.

It is, therefore, possible to apply higher current at timing at which the generated torque becomes a maximum. It is also possible to avoid applying current in a state in which little torque is obtained even if current is carried no matter how high, or at timing at which reversed torque is generated. Besides, this can be executed in a wide speed range including forward rotation and reverse rotation; speed and torque can be controlled in wide range and motor efficiency can be, thereby, enhanced. In case of a motor driven at arbitrary torque, in particular, it is possible to drive the motor while the motor efficiency is kept the highest.

Additionally, only one position detector 32 is provided in the three-phase motor 20 and the position detector 32 has the disk-shaped magnetic body 33 provided with twelve convex portions on its outer periphery at a pitch of an electric angle of 60° fixed to the rotary shaft 23 of the convex rotor 22 and the detector element 34 having a search coil wound around a yoke core formed out of the permanent magnet and the magnetic body into a U shape attached on the inner wall of the end portion casing 28. This makes it possible to attach the position detector 32 into the dead space between the convex rotor 22 and the casing 28. Thus, the space of the motor does not widen due to the provision of the position detector 32 and the motor can be made small in size. Furthermore, the disk-shaped magnetic body 33 can function as a slinger preventing contaminants from entering the bearing.

When the motor starts operating, the rotation speed of the convex rotor 22 is slow and a signal level detected from the position detector 32 is low. Due to this, no index pulse is inputted from the comparator 78 to the microcomputer 77. Namely, at the start of motor operation, the driving of the motor is controlled based on the setting without conducting the interruption processing of the microcomputer 77. If the motor speed becomes high to some extent, an index pulse is inputted from the comparator 78 to the microcomputer 77.

Thereafter, the microcomputer 77 controls the driving of the motor by conducting index interruption processing.

Accordingly, at the start of the operation of the motor, the motor can be driven in forward and backward directions in an open loop without interruption and the position detector 32 does not start signal processing until the motor speed becomes high enough, thereby making it possible to easily and efficiently conduct the signal processing.

Second Embodiment

Next, the second embodiment of the present invention discloses a driving apparatus which conducts interruption processing according to a pulse signal from a position detector and switches phases as in the case of the first embodiment. The second embodiment differs from the first embodiment in the way to wind coils around the respective magnetic poles of the stator of a driving target or a polyphase motor and in the number of FETs used for the driving apparatus. The second embodiment, therefore, concerns a driving apparatus having characteristic features accordingly. In the second embodiment, a three-phase motor used as a polyphase motor will be described.

Figure 17:
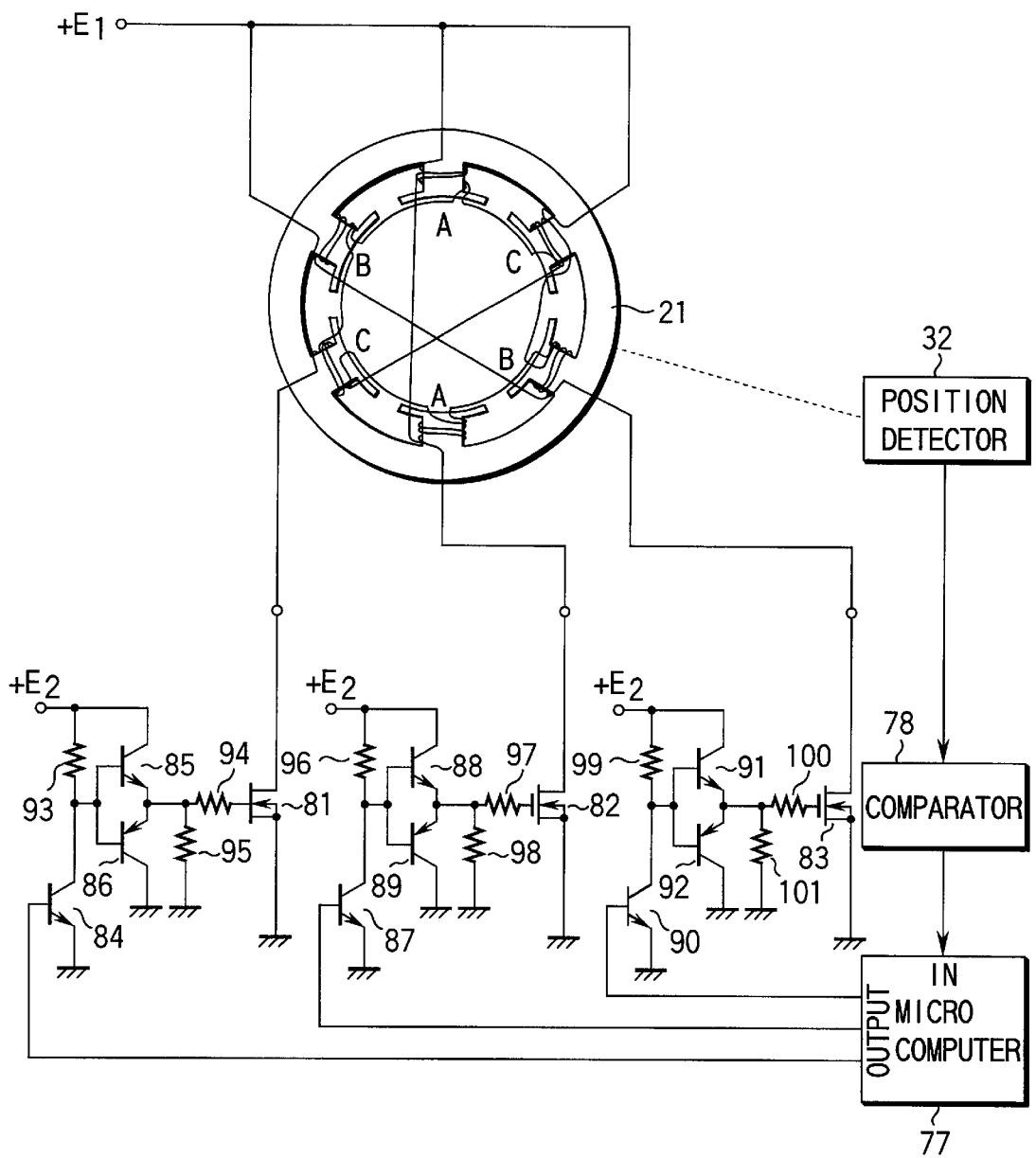
FIG. 17 shows the arrangement of coils wound around a stator and the circuit arrangement of a driving apparatus in the second embodiment according to the present invention.
Figure 18A:
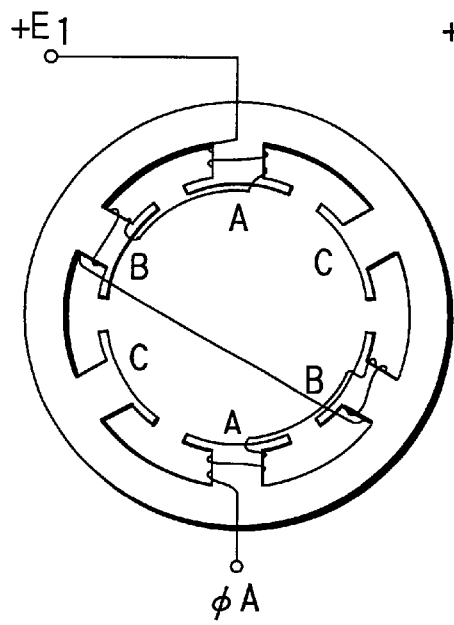
FIGS. 18A, 18B and 18C are views for explaining the way to wind a coil around the stator in the second embodiment.
Figure 18B:
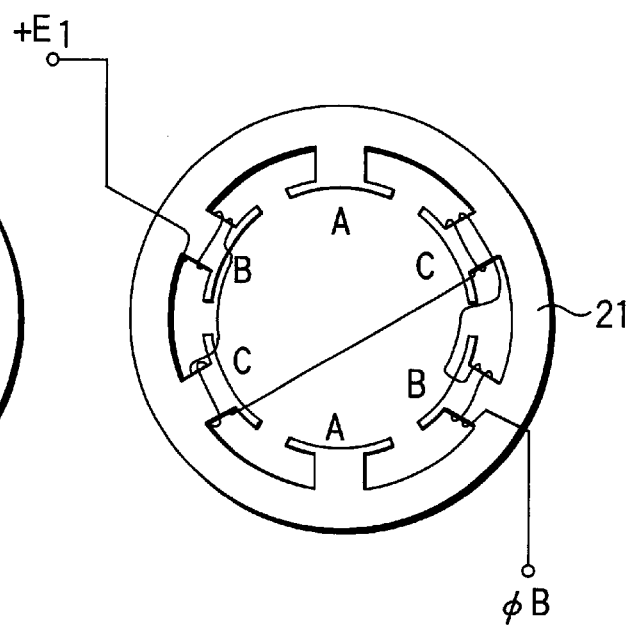
Figure 18C:
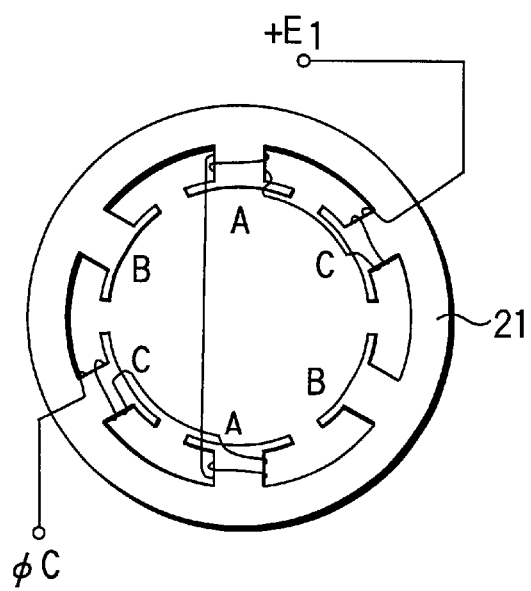
Figure 19A:
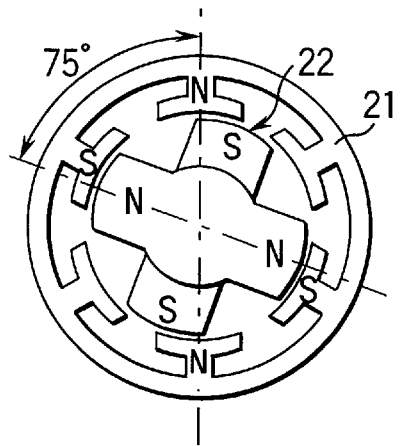
FIGS. 19A, 19B, 19C, 19D, 19E and 19F show the variation of balanced positions of a convex rotor and a stator in the second embodiment.
Figure 19B:
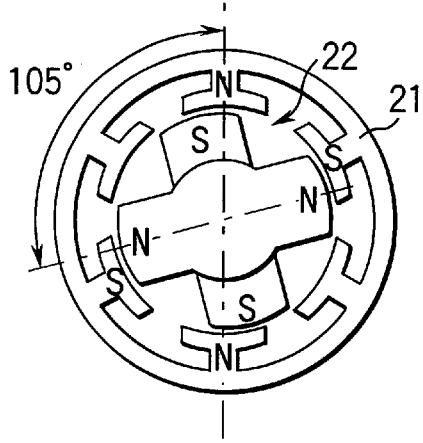
Figure 19C:
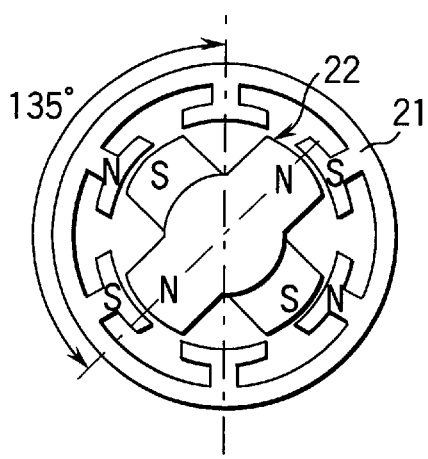
Figure 19D:
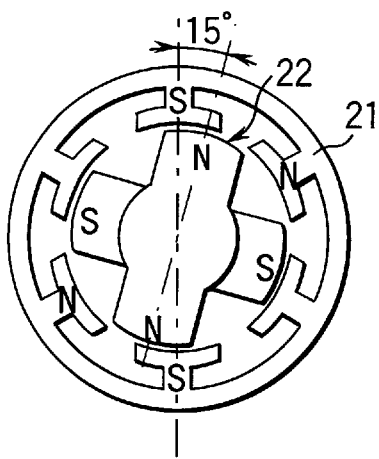
Figure 19E:
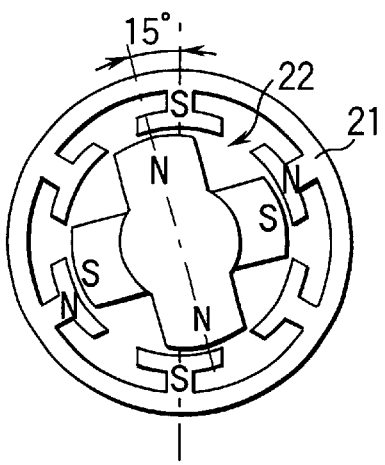
Figure 19F:
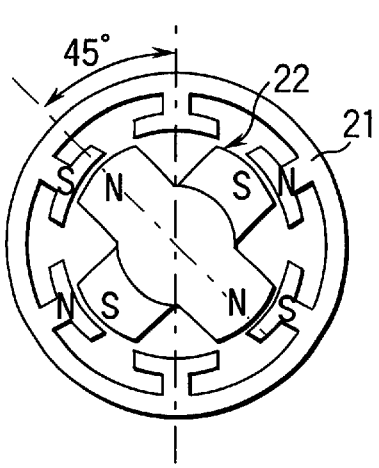

As shown in FIG. 17, coils in A and B phases, B and C phases and C and A phases are simultaneously wound in a concentrated manner and 180-degree symmetric. That is, as shown in FIG. 18A, a coil is wound around one magnetic pole in A phase, one magnetic pole in B phase, the other magnetic pole in B phase facing one magnetic pole in B phase and then the other magnetic pole in A phase. As shown in FIG. 18B, another coil is wound around one magnetic pole in B phase, one magnetic pole in C phase, the other magnetic pole facing one magnetic pole in C phase and finally the other magnetic pole in B phase. As shown in FIG. 18C, yet another coil is wound around one magnetic pole in C phase, one magnetic pole in A phase, the other magnetic pole in A phase facing one magnetic pole in A phase and then the other magnetic pole in C phase. Thereafter, one ends of the coils are connected to a terminal +E and the other ends thereof are connected to the drains of the seventh, eighth and ninth FETs (field effect transistors) 81, 82 and 83, respectively. The sources of the FETs 81, 82 and 83 are grounded.

The 13th NPN transistor 84 and a series circuit consisting of the 14th NPN transistor 85 and the 15th PNP transistor 86 corresponding to the seventh FET 81 are provided. The 16th NPN transistor 87 and a series circuit consisting of the 17th NPN transistor 88 and the 18th PNP transistor 89 corresponding to the eighth FET 82 are provided. The 19th NPN transistor 90 and a series circuit consisting of the 20th NPN transistor and the 21st PNP transistor 92 corresponding to the ninth FET 83 are provided.

The collector of the 13th transistor 84 is connected to a terminal +E$_2$ through a resistor 93 and to the bases of the 14th and 15th transistors 85 and 86, and the emitter of the 13th transistor 84 is grounded. In the series circuit of the 14th and 15th transistors 85 and 86, the collector of the transistor 85 is connected to the terminal +E$_2$, the collector of the transistor 86 is grounded and the node between the emitters of the transistors 85 and 86 is connected to the gate of the seventh FET 81 through a resistor 94 and grounded through a register 95.

The collector of the 16th transistor 87 is connected to the terminal +E$_2$ through a resistor 96 and to the bases of the 17th and 18th transistors 88 and 89, and the emitter of the 16th transistor 87 is grounded. In the series circuit of the 17th and 18th transistors 88 and 89, the collector of the transistor 88 is connected to the terminal +E$_2$, the collector of the transistor 89 is grounded and the node between the emitters of the transistors 88 and 89 is connected to the gate of the eighth FET 82 through a resistor 97 and grounded through a register 98.

The collector of the 19th transistor 90 is connected to the terminal +E$_2$ through a resistor 99 and to the bases of the 20th and 21st transistors 91 and 92, and the emitter of the 19th transistor 90 is grounded. In the series circuit of the 20th and 21st transistors 91 and 92, the collector of the transistor 91 is connected to the terminal +E$_2$, the collector of the transistor 92 is grounded and the node between the emitters of the transistors 91 and 92 is connected to the gate of the ninth FET 83 through a resistor 100 and grounded through a register 101.

Bit signals are supplied from the output ports 6, 4 and 5 of the microcomputer to the bases of the 13th, 16th and 19th transistors 84, 87 and 90, respectively. FIG. 26 shows the relationship between the outputs of the output ports of the microcomputer and excitation phase statuses PS1 to PS6 when the motor is rotated by switching an excitation phase in the notation of both the eight-bit binary number and hexadecimal number.

That is, in the excitation phase status PS1, the eight bits of the output ports 7 to 0 are "0, 1, 1, 0, 0, 0, 0, 0". In this status, the 13th transistor 84 is turned on, the 19th transistor 90 is turned on, the 16th transistor 87 is turned off, the seventh FET 81 is turned off, the ninth FET 83 is turned off and the eighth FET 82 is turned on.

In the excitation phase status PS2, the eight bits of the output ports 7 to 0 are "0, 1, 0, 0, 0, 0, 0, 0". In this status, the 13th transistor 84 is turned on, the 19th transistor 90 is turned off, the 16th transistor 87 is turned off, the seventh FET 81 is turned off, the ninth FET 83 is turned on and the eighth FET 82 is turned on.

In the excitation phase status PS3, the eight bits of the output ports 7 to 0 are "0, 1, 0, 1, 0, 0, 0, 0". In this status, the 13th transistor 84 is turned on, the 19th transistor 90 is turned off, the 16th transistor 87 is turned on, the seventh FET 81 is turned off, the ninth FET 83 is turned on and the eighth FET 82 is turned off.

In the excitation phase status PS4, the eight bits of the output ports 7 to 0 are "0, 0, 0, 1, 0, 0, 0, 0". In this status, the 13th transistor 84 is turned off, the 19th transistor 90 is turned off, the 16th transistor 87 is turned on, the seventh FET 81 is turned off, the ninth FET 83 is turned off and the eighth FET 82 is turned on.

In the excitation phase status PS5, the eight bits of the output ports 7 to 0 are "0, 0, 1, 1, 0, 0, 0, 0". In this status, the 13th transistor 84 is turned off, the 19th transistor 90 is turned on, the 16th transistor 87 is turned on, the seventh FET 81 is turned off, the ninth FET 83 is turned on and the eighth FET 82 is turned on.

In the excitation phase status PS6, the eight bits of the output ports 7 to 0 are "0, 0, 1, 0, 0, 0, 0, 0". In this status, the 13th transistor 84 is turned off, the 19th transistor 90 is turned on, the 16th transistor 87 is turned off, the seventh FET 81 is turned on, the ninth FET 83 is turned off and the eighth FET 82 is turned on.

If the excitation phase statuses PS1 to PS6 shown in FIG. 26 are executed in this order or the reversed order, the three-phase motor 20 can be rotated in arbitrary direction, forward or backward.

FIGS. 19A to 19F show the change of the balanced positions of the convex rotor 22 and the stator 21 in a sequence shown in FIG. 26 and also show a state in which the balanced positions are changed step by step from (a) to (f) by a mechanical angle of 30° according to the change of the positions.

Figure 20:
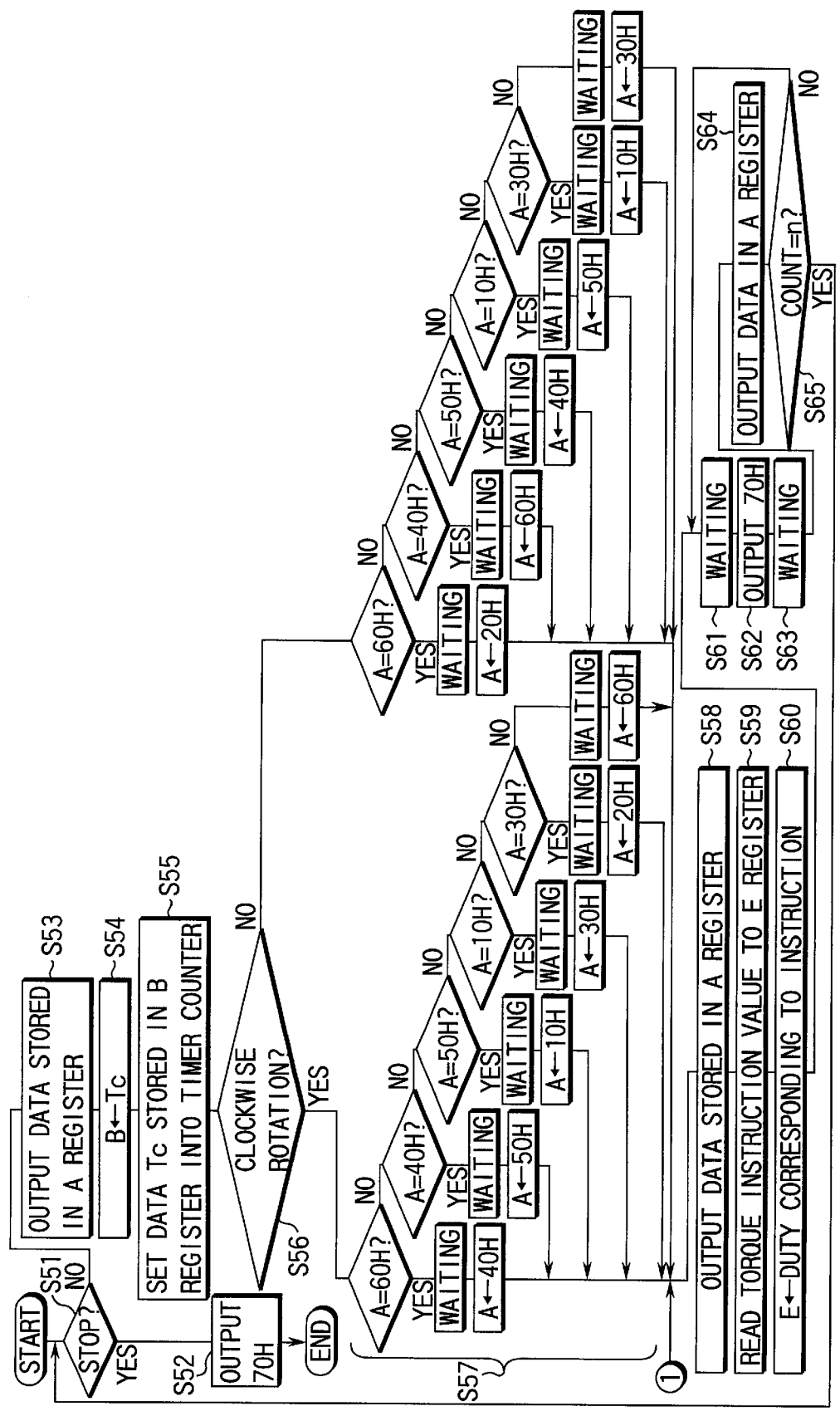
FIG. 20 is a flowchart showing the main processing of a microcomputer in the second embodiment.
Figure 21:
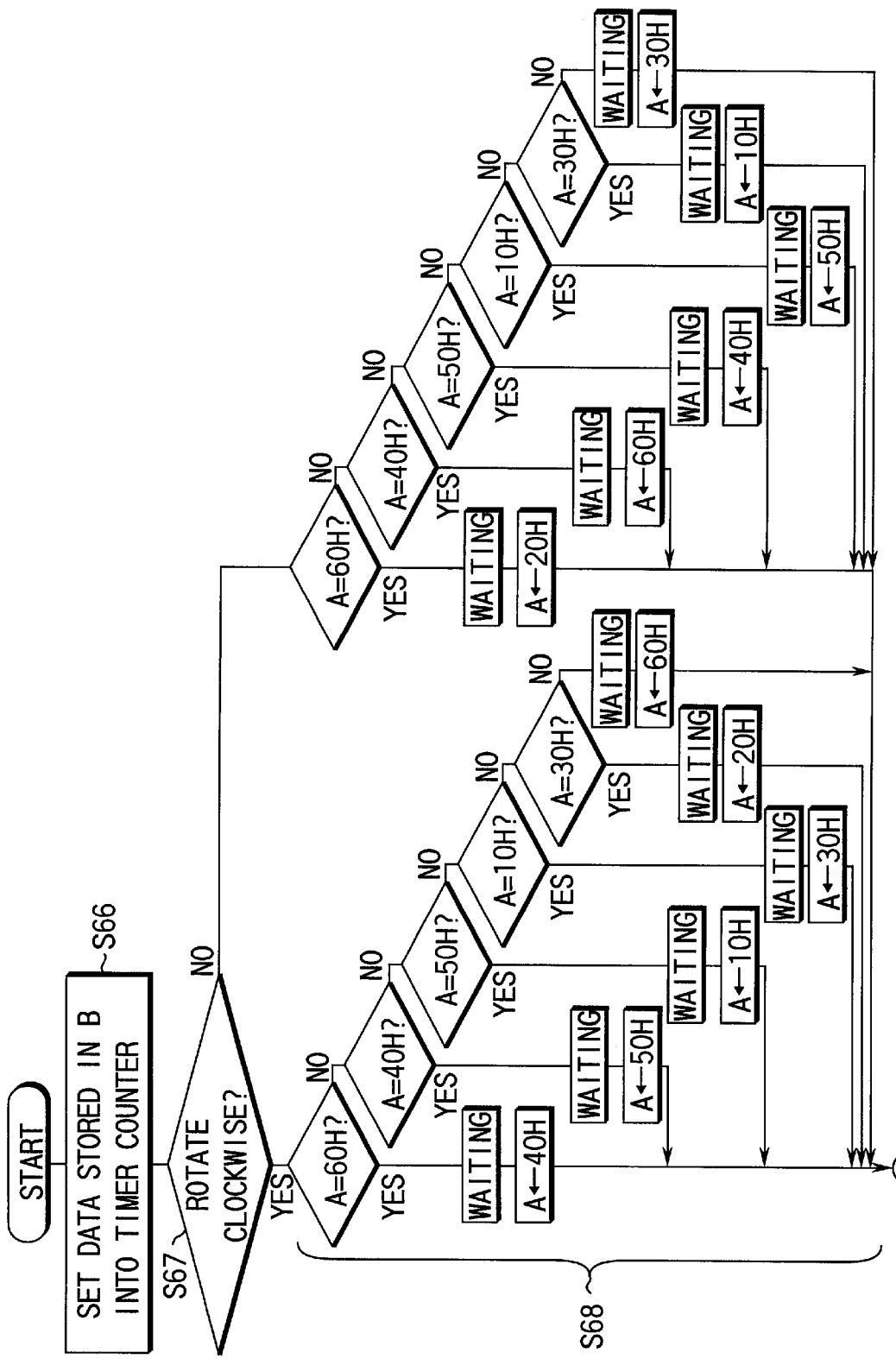
FIG. 21 is a flowchart showing the timer interruption processing of the microcomputer in the second embodiment.
Figure 22:
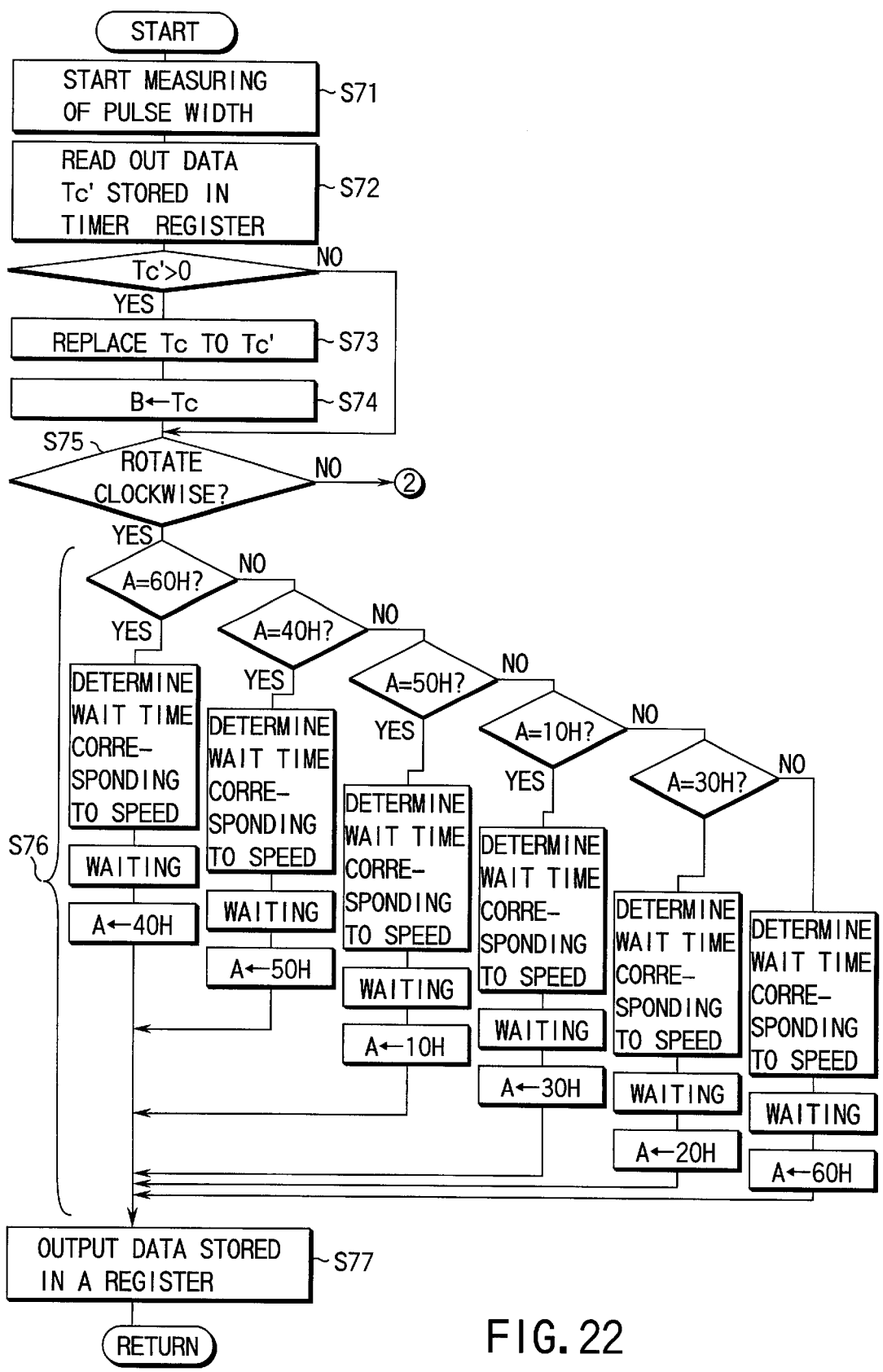
FIG. 22 is a flowchart showing part of the index interruption processing of the microcomputer in the second embodiment.
Figure 23:
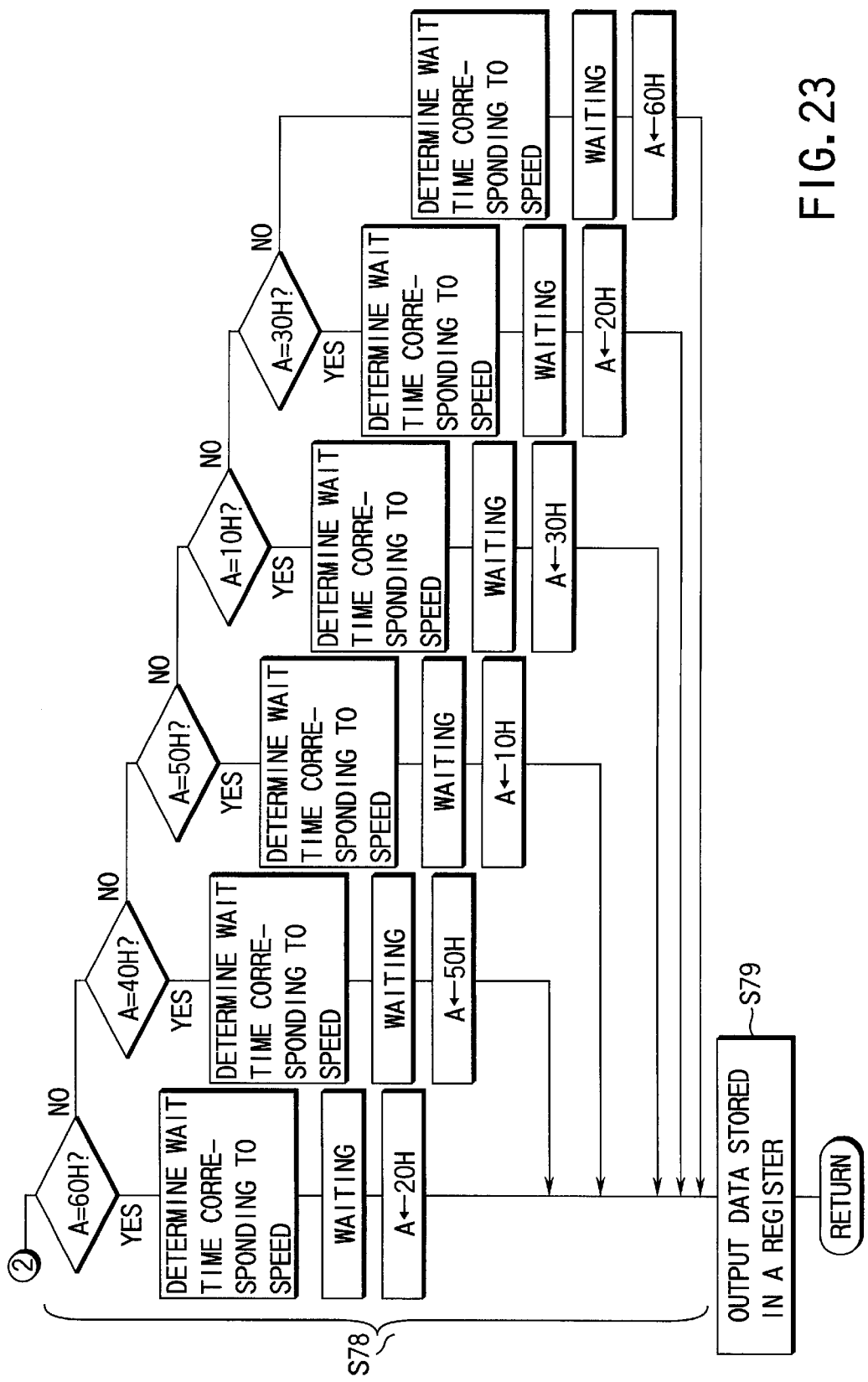
FIG. 23 is a flowchart showing part of the index interruption processing of the microcomputer in the second embodiment.

The microcomputer conducts main processing shown in FIG. 20, timer interruption processing shown in FIG. 21 and index interruption processing shown in FIGS. 22 and 23.

In the main processing shown in FIG. 20, when power is turned on, it is determined whether an external signal instructs the motor to stop rotating or to rotate in step S51. If it is determined that the external signal instructs the motor to stop rotating, then data 70H, i.e., "01110000" are outputted to the output ports 7 to 0, all of the FETs 81 to 83 are turned off and the processing is ended in step S52.

If it is determined that the external signal instructs the motor to rotate in step S51, an initial value stored in an A register, e.g., data "10H" is outputted to the output ports in step S53 and an initial value Tc in an excitation period is read into a B register in step S54. In step S55, the data Tc stored in the B register is set into a timer counter.

Next, in step S56, the direction of rotation is determined. In step S57, it is determined in what status an output states are when the rotation is clockwise and counterclockwise, respectively and the data stored in the A register is replaced according to the determination result. In step S58, the data newly stored in the A register is outputted to the output ports.

In step S59, a torque instruction value is read into an E register. In step S60, a duty ratio of current carrying time corresponding to the torque instruction value is read into the E register. In step S61, wait time is given by a software timer. In step S62, data "70H" is outputted to the output ports to conduct de-excitation control. In step S63, wait time is given by the software timer. In step S64, the data stored in the A register is outputted to the output ports to conduct excitation control. Further, in step S65, it is determined whether or not the count value of a counter reaches n. If the value does not reach n, the processing returns to step S61 and waits. That is, using the software timer, keeping time intervals between the de-excitation state and the excitation state, de-excitation control and excitation control are repeatedly conducted. If the excitation time Tc elapses during this moment, timer interruption is conducted.

In timer interruption, as shown in FIG. 21, the data Tc stored in the B register is set into the timer counter in step 66. In step S67, the direction of rotation is determined. In step S68, it is determined in what status output states are when rotation is clockwise and counterclockwise, respectively and the data stored in the A register is replaced according to the determination result. Then, the routine returns to step S58 shown in FIG. 20, i.e., the processing for outputting the data stored in the A register to the output ports.

In step S65, if the count value of the counter reaches n, the processing returns to step S51, in which it is determined whether the external signal instructs the motor to stop rotating or rotate.

If an index pulse is inputted to the computer from a comparator as a result of the detecting operation of the position detector during this processing, index interruption processing shown in FIGS. 22 and 23 is started.

In this index interruption processing, after an excitation phase is switched and data output is changed, the processing returns to the main routine. That is to say, in step S71, the pulse width between an index pulse and the next index pulse is measured and a measurement value Tc' is stored in a timer register. In step S72, the data Tc' stored in the timer register is read. If Tc'>0, the value Tc of the timer counter is replaced by Tc' and the new Tc is stored in the B register in step S74.

Next, in step S75, it is determined whether the rotation of the motor is clockwise or counterclockwise. If the rotation is clockwise, it is determined in what status the output state is during this moment and the data stores in the A register is replaced according to the determination result in step S76. In step S77, the data stored in the A register is outputted to the output ports and the processing returns to the main processing. If the rotation is counterclockwise, it is determined in what status the output state is during this moment and the data stored in the A register is replaced according to the determination result in step S78 shown in FIG. 23. In step S79, the data stored in the A register is outputted to the output ports and the processing returns to the main processing.

With the constitution stated above, the number of FETs to be used can be made as small as three and the number of transistors to be used for controlling the FETs can be, therefore, reduced. As a result, the circuit arrangement of the driving apparatus is simpler and necessary circuit space can be further reduced. The other advantages are the same as those obtained in the first embodiment.

The above-stated embodiments concern a case where the present invention is applied to a three-phase motor. However, the present invention should not be limited thereto and can be applied to other polyphase motor driving apparatuses such as those for a two-phase motor, a four-phase motor and a five-phase motor.

Furthermore, the above-stated embodiments employs a position detector which detects the position of the convex rotor every time the rotor rotates by an electric angle of 60°. The present invention should not be, however, limited thereto and can employ a position detector for detecting the position of a convex rotor every time the rotor rotates by an electric angle of 120°. In short, any position detectors will suffice as long as they detect the position of the rotor every time the rotor rotates by an electric angle of 360°/n or 360°/2n, where n is a positive integer, depending on the type of a polyphase motor to be used.

As stated so far, according to the first embodiment of the present invention, the present position of the rotor can be informed for every pulse signal outputted from the position detector concentric with the rotary shaft of the polyphase motor and a polyphase current is supplied at an optimum angle based on the present position of the rotor. Due to this, even if a load is suddenly applied to the polyphase motor, a current is supplied at optimum timing, whereby the wide range of speed control and torque control can be conducted and a polyphase motor driving apparatus capable of realizing the highest efficiency in a stable manner can be provided.

Moreover, according to the second embodiment of the present invention, coils are wound around the magnetic poles of the stator of the polyphase motor so that the adjacent magnetic poles have different magnetism, whereby the number of switching elements in the driving apparatus can be halved. The circuit arrangement and the control method are simplified, whereby circuit space can be reduced and a very economical polyphase motor driving apparatus can be, therefore, provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polyphase motor driving system comprising:

a polyphase motor having a rotor provided with a rotary shaft and a plurality of permanent magnets connected to a circumference of the rotary shaft; and an annular stator surrounding the rotor and rotatably holding the rotor, said stator having n phases and n×m magnetic poles, where n is an integer not less than 3 and m is an integer not less than 1, a coil having a first end connected to a common terminal and wound around each of n pairs of adjacent ones of the magnetic poles so that one of each pair of the magnetic poles serves as a first polarity and the other one of each pair of the magnetic poles serves as a second polarity different from the first polarity, wherein a magnetic field to rotate the rotor is generated by applying a voltage having the phases between the common terminal and a second end of the coil of each of the pairs;

means for receiving a pulse signal from a position detector which is connected to the rotary shaft of the rotor of the polyphase motor and which generates the pulse signal every time the rotor rotates by an electric angle of 360°/n, where n is a positive integer; and means for judging a present position of the rotor every time one pulse of the pulse signal is received, and for supplying a polyphase current to the polyphase motor at a timing based on the judgment, thereby switching an excitation phase of the polyphase motor and rotating the rotor.

2. A polyphase motor driving system according to claim 1, wherein the judging means comprises computer control means for controlling the polyphase current according to a given rotation direction and rotation speed of the rotor in accordance with a pre-stored processing program, effecting an interruption to the pre-stored processing program every time one pulse of the pulse signal is received, judging the present position of the rotor, and supplying the polyphase current to the polyphase motor at the timing based on the judgment, thereby switching the excitation phase of the polyphase motor and rotating the rotor.

3. A polyphase motor driving apparatus comprising:

means for receiving a pulse signal from a position detector which is connected to a rotary shaft of a rotor, having a plurality of poles, of a polyphase motor provided with a stator having a plurality of poles and which generates the pulse signal every time the rotor rotates by at least an electric angle of 360°/n, where n is a positive integer; and computer control means for controlling a polyphase current according to a given rotation direction and rotation speed of the rotor in accordance with a pre-stored processing program, effecting an interruption to the pre-stored processing program every time one pulse of the pulse signal is received, judging a present position of the rotor, and supplying the polyphase current to the polyphase motor at a timing based on the judgment, thereby switching an excitation phase of the polyphase motor and rotating the rotor.

4. The polyphase motor driving apparatus according to claim 3, wherein the computer control means comprises means for judging the rotation speed of the rotor from a result of counting continuously supplied pulse signals received from the receiving means, means for determining a wait time based on the judgment, and means for supplying the polyphase current to the polyphase motor after passage of the wait time.

5. The polyphase motor driving apparatus according to claim 3, wherein the position detector generates the pulse signal every time the rotor rotates by an electric angle of 180°/n.

6. The polyphase motor driving apparatus according to claim 3, wherein the computer control means comprises means for counting a time interval between the received pulse signals, means for calculating a deviation quantity between the given rotation speed of the rotor and the counted time interval, means for calculating an excitation time proportional to the calculated deviation quantity, and means for controlling excitation of the magnetic poles of the stator based on the calculated excitation time.

7. The polyphase motor driving apparatus according to claim 3, wherein the computer control means comprises means for storing a duty of a phase current corresponding to a given torque instruction value, and means for controlling excitation of the magnetic poles of the stator based on the duty corresponding to the given torque instruction value.

8. The polyphase motor driving apparatus according to claim 3, wherein the position detector comprises a disk-shaped magnetic body that has a plurality of convex portions on an outer periphery thereof at a pitch of an electric angle of 180°/n and that rotates with the rotor, and a detection element that detects a change of magnetic resistance caused by passage of the plurality of convex portions of the disk-shaped magnetic body.

9. The polyphase motor driving apparatus according to claim 3, wherein the position detector comprises a disk-shaped magnetic body that has a plurality of convex portions on an outer periphery thereof at a pitch of an electric angle of 360°/n and that rotates with the rotor, and a detection element that detects a change of magnetic resistance caused by passage of the plurality of convex portions of the disk-shaped magnetic body.

10. A method of driving a polyphase motor comprising:

receiving a pulse signal from a position detector which is connected to a rotary shaft of a rotor, having a plurality of poles, of a polyphase motor provided with a stator having a plurality of poles and which generates the pulse signal every time the rotor rotates by an electric angle of 360°/n, where n is a positive integer; and controlling a polyphase current according to a given rotation direction and rotation speed of the rotor in accordance with a pre-stored processing program, judging a present position of the rotor every time one pulse of the pulse signal is received, and supplying the polyphase current to the polyphase motor at a timing based on the judgment, thereby switching an excitation phase of the polyphase motor and rotating the rotor.

* * * * *